(12) United States Patent
Niikawa et al.

(10) Patent No.: US 7,230,647 B1
(45) Date of Patent: Jun. 12, 2007

(54) ELECTRONIC INFORMATION DEVICE HAVING A DISPLAY AND METHOD AND APPARATUS FOR CONTROLLING POWER-OFF OF THE DISPLAY

(75) Inventors: Masahito Niikawa, Sakai (JP); Naoki Masazumi, Kobe (JP); Kiyofumi Hashimoto, Suita (JP); Yasuhiro Morimoto, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/527,350

(22) Filed: Mar. 17, 2000

(30) Foreign Application Priority Data

Mar. 23, 1999 (JP) .................. 11-078117

(51) Int. Cl.
*H04N 5/222* (2006.01)

(52) U.S. Cl. ................................ 348/333.13

(58) Field of Classification Search ........... 348/333.13, 348/231.99, 231.9; 345/211
See application file for complete search history.

(56) References Cited

U.S. PATENT DOCUMENTS

| | | | |
|---|---|---|---|
| 5,384,067 A | | 1/1995 | Doane et al. |
| 5,402,170 A | * | 3/1995 | Parulski et al. ............. 348/211 |
| 5,625,477 A | | 4/1997 | Wu et al. |
| 5,627,569 A | * | 5/1997 | Matsuzaki et al. .......... 345/211 |
| 5,768,604 A | * | 6/1998 | Yamazaki et al. ..... 395/750.05 |
| 6,473,058 B1 | * | 10/2002 | Hotomi et al. .............. 345/211 |

FOREIGN PATENT DOCUMENTS

| | | |
|---|---|---|
| JP | 1-117580 A | 5/1989 |
| JP | 1-248767 A | 10/1989 |
| JP | 1-305784 A | 12/1989 |
| JP | 2-643342 A | 2/1990 |
| JP | 7-101336 A | 12/1990 |
| JP | 5-012851 A | 1/1993 |
| JP | 5-062458 A | 3/1993 |
| JP | 5-081824 A | 4/1993 |
| JP | 6-243630 A | 9/1994 |
| JP | 7-006842 A | 1/1995 |
| JP | 7-078447 A | 3/1995 |
| JP | 7-098993 A | 4/1995 |
| JP | 7-234635 A | 9/1995 |
| JP | 7-296574 A | 11/1995 |
| JP | 8-317324 A | 11/1996 |
| JP | 9-050502 A | 2/1997 |
| JP | 9-218930 A | 8/1997 |
| JP | 10-197850 A | 7/1998 |
| JP | 11-096327 A | 4/1999 |

OTHER PUBLICATIONS

U.S. Appl. No. 09/527,354, filed Mar. 17, 2000, Masahito Niikawa et al.
U.S. Appl. No. 09/528,927, filed Mar. 20, 2000, Yasuhiro Morimoto et al.
U.S. Appl. No. 09/528,356, filed Mar. 17, 2000, Masahito Niikawa et al.
U.S. Appl. No. 09/528,607, filed Mar. 20, 2000, Masahito Niikawa et al.

* cited by examiner

*Primary Examiner*—Vivek Srivastava
*Assistant Examiner*—James M. Hannett
(74) *Attorney, Agent, or Firm*—Sidley Austin LLP

(57) ABSTRACT

An electronic information device which uses a memory card to which a liquid crystal display using liquid crystal with a memory effect is attached. If a command to turn off the electric power source is issued during writing of information on the liquid crystal display, a power-off process is executed after completion of the writing. This electronic information device is adapted, for example, to be used as a digital camera.

26 Claims, 28 Drawing Sheets

FIG. 9
FIG. 9a
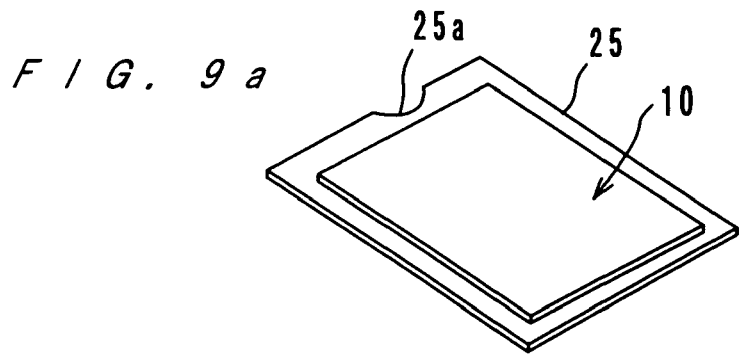
FIG. 9b
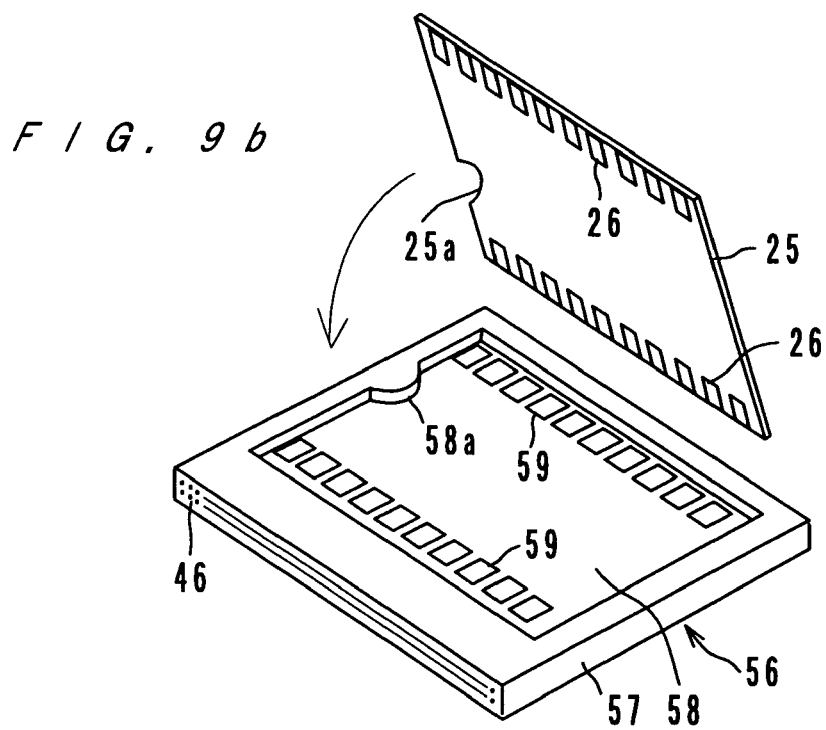
FIG. 9c
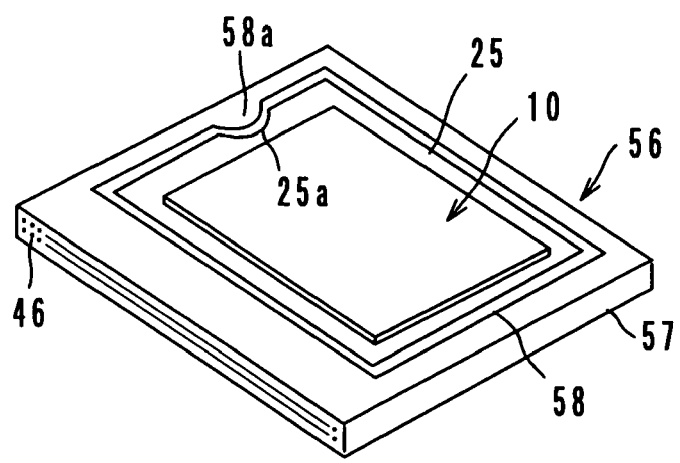

F I G. 10
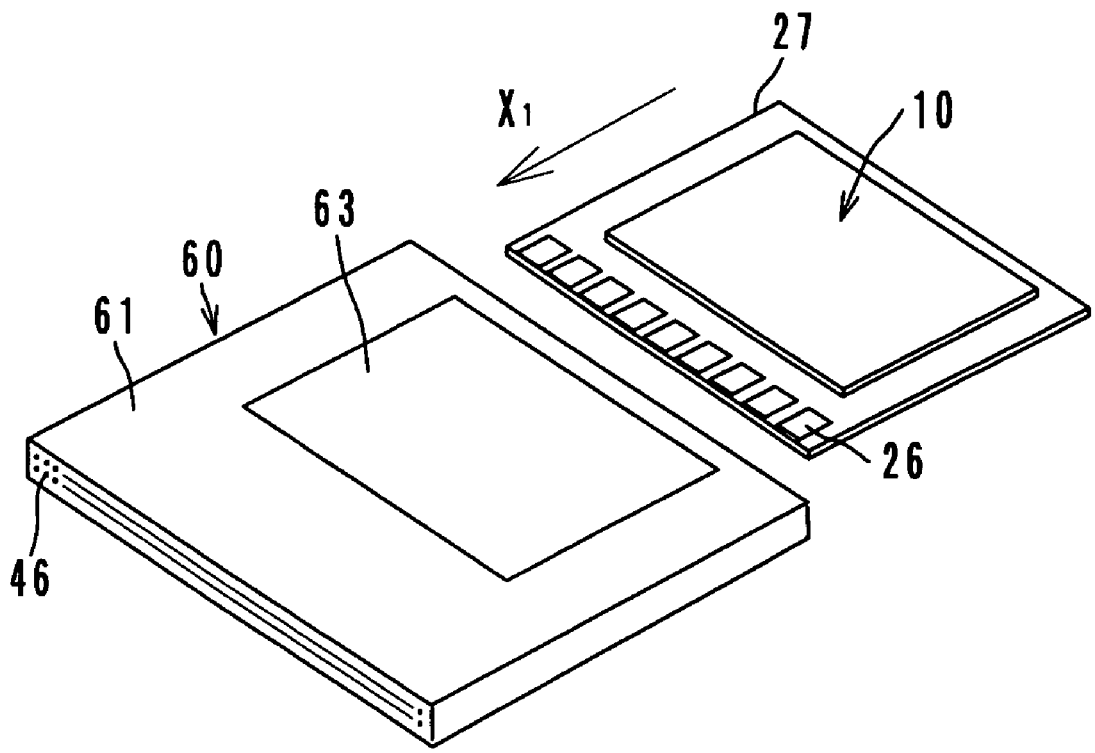
F I G. 11
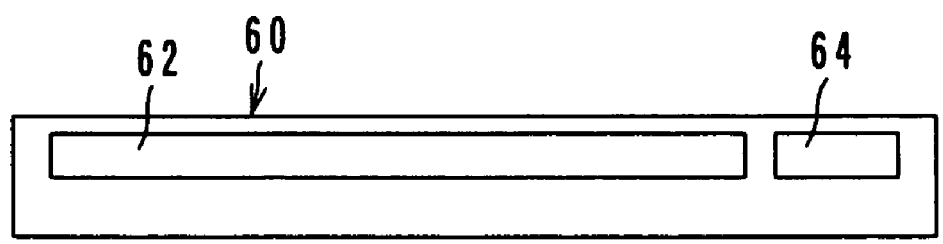

F I G. 1 4
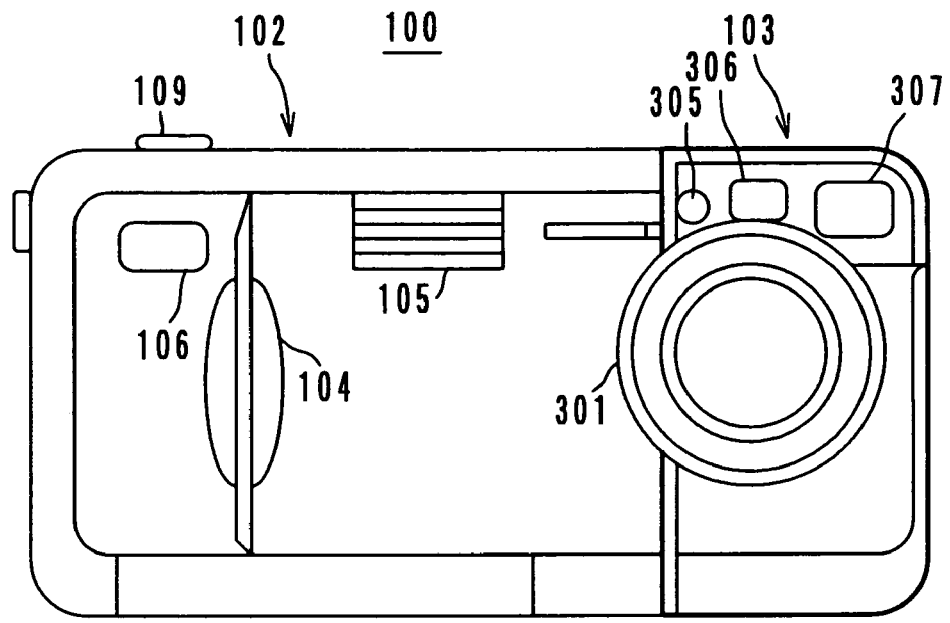
F I G. 1 5
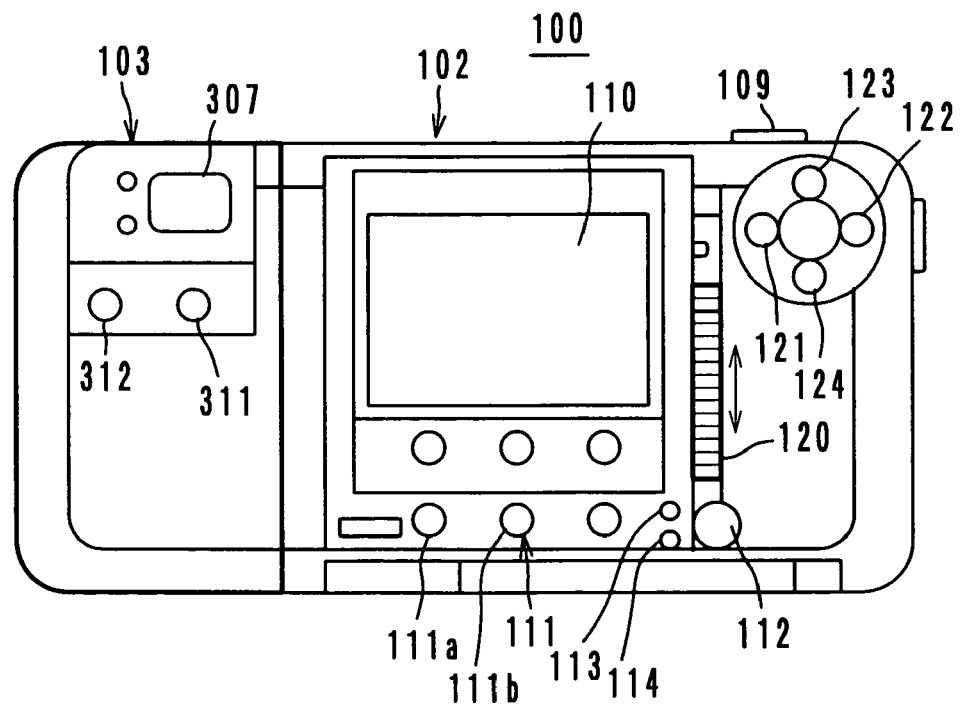

ELECTRONIC INFORMATION DEVICE HAVING A DISPLAY AND METHOD AND APPARATUS FOR CONTROLLING POWER-OFF OF THE DISPLAY

This application is based on application No. 11-78117 filed in Japan, the content of which is hereby incorporated by reference.

BACKGROUND OF THE INVENTION

1. Field of the Invention

The present invention relates to various kinds of electronic information devices such as digital cameras, TV sets, personal computers, electronic books, man-machine interfaces, etc, and a control method of such a device.

2. Description of Related Art

With development of electronic information devices which require a display section to display images, such as computers, digital cameras, etc., various display devices using materials with a memory effect have been developed. For example, Japanese Patent Laid Open Publication No. 8-317324 describes an embodiment of adopting ferrodielectric liquid crystal to an electronic camera. Japanese Patent Laid Open Publication No. 10-197850 describes an embodiment of using ferrodielectric liquid crystal in a display device for a pen computer so as to save energy.

Such a display device using a material with a memory effect has an advantage of consuming no electric power in maintaining a picture on the display, while consuming electric power in writing information on the display. For example, Japanese Patent Publication No. 7-101336 discloses that a supply of electric power to a display panel with a memory effect is shut off after the display panel has made a display of a calendar, a picture, etc.

In the display device disclosed by Japanese Patent Publication No. 7-101336, however, if a supply of electric power is shut off during image writing on the display, an incompletely written picture stays on the display, which is ugly. Thus, in such a display device using a material with a memory effect, the display sequence must be changed. There is no prior art which focuses on a power-down during image writing on a display with a memory effect. If a supply of electric power is shut off suddenly, there may be a case that an incompletely written image is displayed continuously. In order to avoid such trouble, it is necessary to time a power-down of the display section to completion of image writing on the display, which is inconvenient.

Conventionally, only ferrodielectric liquid crystal is regarded as a material with a memory effect. Recently, however, cholesteric liquid crystal and chiral nematic liquid crystal start to be used practically. For example, U.S. Pat. No. 5,625,477 discloses a method of displaying a multi-tone image on chiral nematic liquid crystal.

Accordingly, in the art of display devices using materials with a memory effect, it is required to improve the control of image writing and power off so as to display a complete picture at all times. Further, in the art of electronic information device used as a man-machine interface which has an input section (including a power switch) with which an operator inputs a specified command and a display section with a memory effect, it is necessary to improve the association of the input section with the display section to improve the operability.

SUMMARY OF THE INVENTION

An object of the present invention is to provide an electronic information device with a memory effect which never displays an incomplete picture continuously, and a control method of the electronic information device.

Another object of the present invention is to provide an electronic information device wherein an input section to be operated by an operator and a display section with a memory effect are associated well and which can be easily operated.

In order to attain the objects, an electronic information device according to the present invention comprises: a display which uses a material with a memory effect; an electric power source which supplies driving power to the display; and a controller which, in response to a command to turn off the electric power source which is issued while the display is performing writing by consuming electric power supplied from the electric power source, turns off the electric power source after completion of the writing. The controller may be one which, when an automatic power-off process is commanded while information is being written on the display, turns off the electric power source after completion of the writing.

With the arrangement, even if a power-off command is issued during writing on the display or even if an automatic power-off system works for energy saving, supply of electric power to the display is continued until completion of the writing. Accordingly, it never occurs that an incomplete picture is continuously displayed. Especially, when information is written based on image data, because it has a large volume and requires a long time to be displayed, the delay of execution of a power-off is effective.

Another electronic information device according to the present invention comprises: a display using a material with a memory effect; a first input member with which an operator inputs a specified command; and a controller which, when the first input member is operated during writing on the display, invalidates the command sent from the first input member and, when the first input member is operated after completion of the writing, controls the electronic information device in accordance with the command sent from the first input member. In a display which uses a material with a memory effect, it takes a time to write information thereon. If a command from the first input member is accepted during writing, the writing will be discontinued and repeated from the beginning, which is inefficient. According to the present invention, since a command which is sent from the first input member during writing on the display is invalidated, the efficiency and the convenience of the device are improved.

There are, however, commands which shall be accepted regardless of whether or not writing on the display is being performed. For example, in a digital camera, it is preferred to accept a command sent from a shutter button even during writing on the display so as not to miss a shutter chance.

BRIEF DESCRIPTION OF THE DRAWINGS

These and other objects and features of the present invention will be apparent from the following description with reference to the accompanying drawings, in which:

FIG. 9*a* is a perspective view of a liquid crystal display mounted on a support;

FIG. 9*b* is a perspective view of a supported liquid crystal display being inserted into a recess in a memory card;

FIG. 9*c* is a perspective view of the memory card having the liquid crystal display inserted therein;

FIG. 10 is a perspective view of a fourth memory card;

FIG. 11 is a sectional view of the memory card shown by FIG. 10;

FIG. 14 is a front view of a first exemplary digital camera according to the present invention;

FIG. 15 is a rear view of the digital camera;

DETAILED DESCRIPTION OF THE PREFERRED EMBODIMENTS

Some embodiments of an electronic information device and a control method thereof according to the present invention are described with reference to the accompanying drawings.

General Structure of Memory Card with Memory-Effective Liquid Crystal

First, a memory card which is provided with liquid crystal with a memory effect (which will be hereinafter referred to as a memory card with memory-effective liquid crystal) is described. The memory card is based on the PCMCIA type 2 standard, and when the memory card is used, it is inserted in a PCMCIA card slot of a digital camera or a personal computer. The memory card comprises a memory section and a display section. For the memory section, a conventional flash memory is used, and for the display section, a liquid crystal composition which has a memory effect and exhibits a cholesteric phase at room temperature (which will be hereinafter referred to as cholesteric liquid crystal) is used.

Display Principle of Memory-Effective Liquid Crystal

Figure 1:
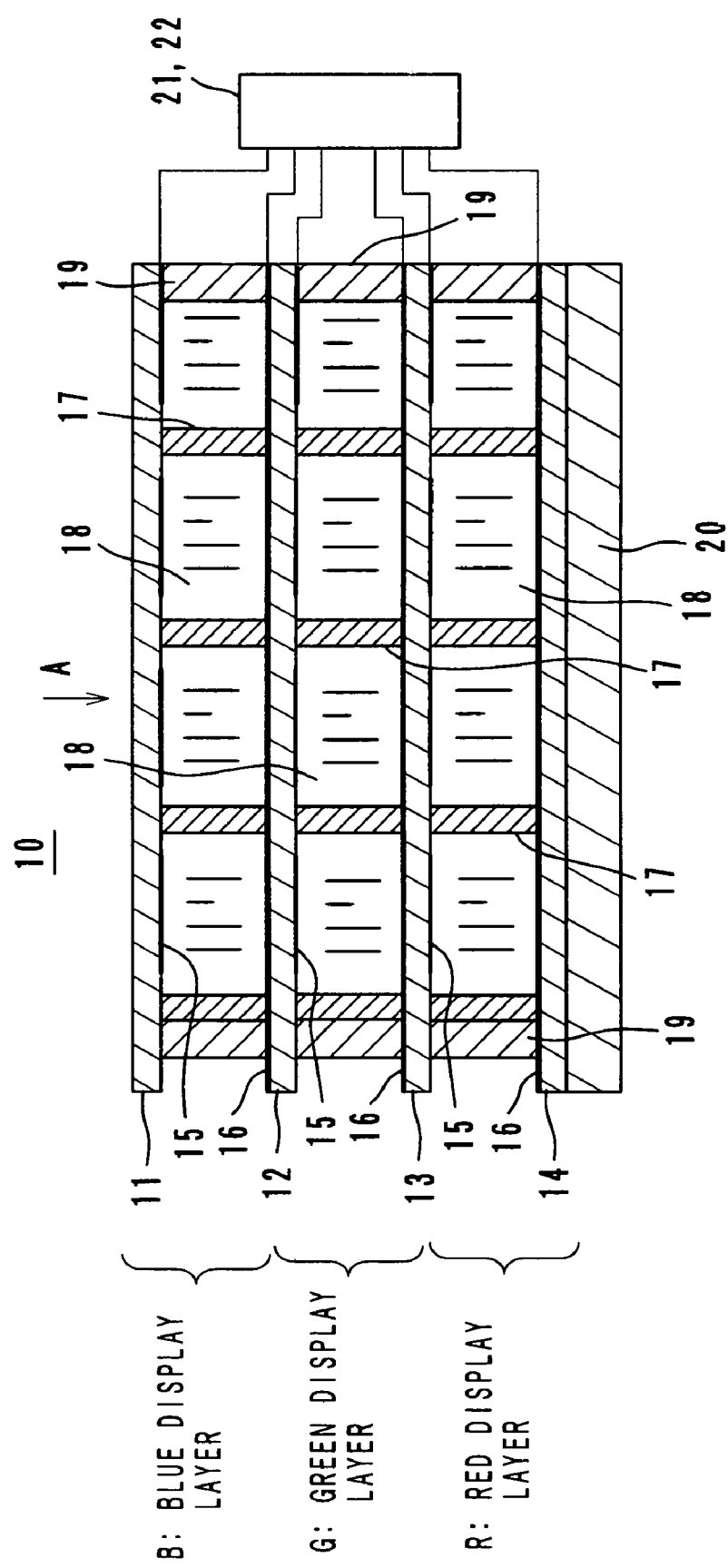
FIG. 1 is a sectional view of an exemplary liquid crystal display to be employed in a data storage medium.

First, a liquid crystal display device used as the display section is described. The liquid crystal display device comprises a liquid crystal display which has cholesteric liquid crystal between substrates and a driving section thereof. FIG. 1 is a sectional structural view of an exemplary liquid crystal display 10.

Figure 2:
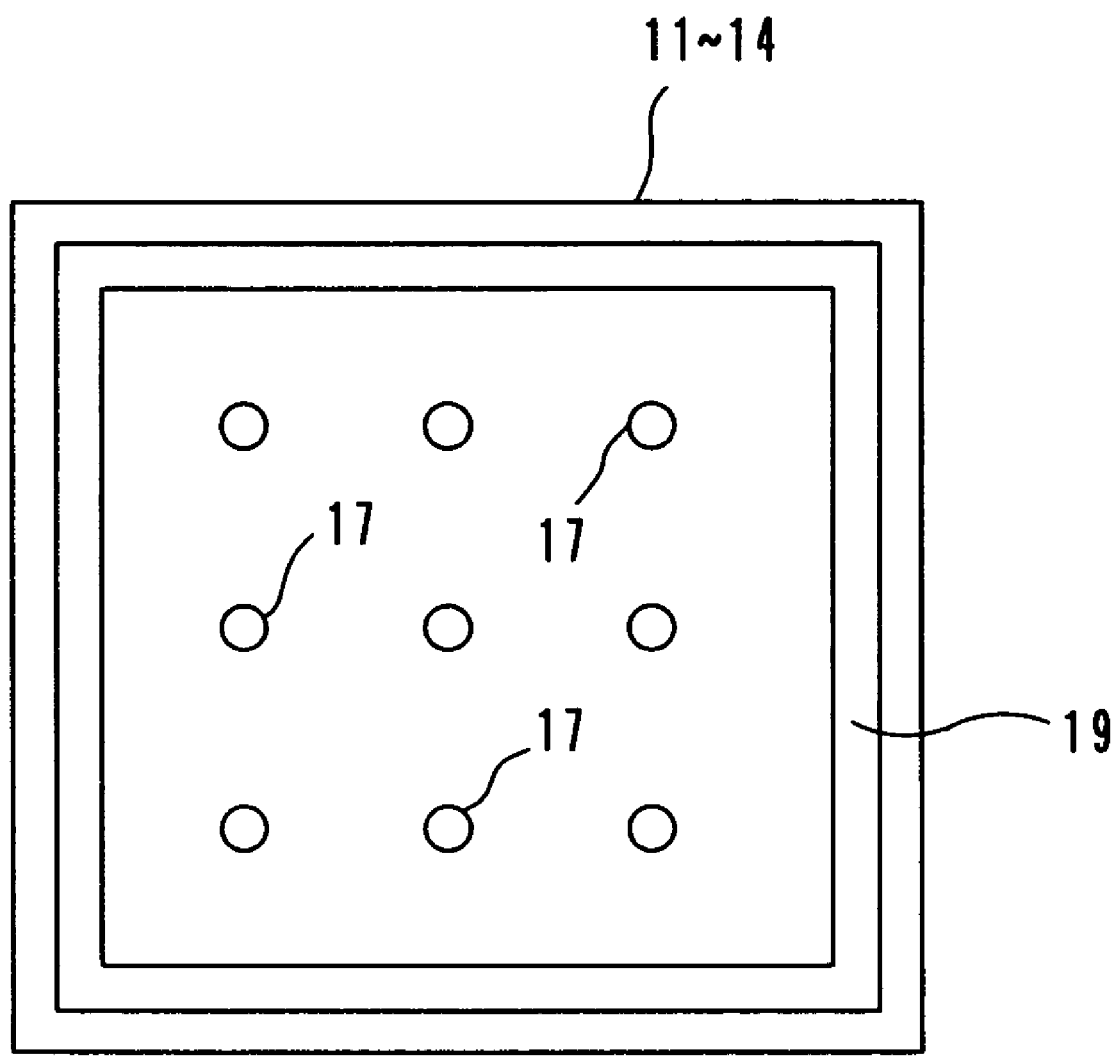
FIG. 2 is a plan view which shows a state of forming a columnar structure and a sealant on a substrate of the liquid crystal display.

In FIG. 1, the numerals 11, 12, 13 and 14 are transparent substrates. On the front and back surfaces of these transparent substrates, a plurality of strip-like transparent electrodes 15 and 16 are provided. The electrode strips 15 extend in parallel to one another, and the electrode strips 16 extend in parallel to one another with the extending direction of the electrode strips 15 and the extending direction of the electrode strips 16 being perpendicular to each other. In short, the electrodes 15 and 16 are arranged in a matrix. A voltage is applied to the intersections of the electrodes 15 and 16, and these intersections function as pixels. The numeral 17 is a columnar structure composed of columns which are arranged entirely in the transparent substrates among the pixels at regular intervals (or maybe at random) (see FIG. 2). The numeral 18 is a cholesteric liquid crystal composition. The numeral 19 is a sealant to seal the liquid crystal composition 18 in the transparent substrates. If necessary, insulating layers and alignment controlling layers may be provided on the transparent electrodes 15 and 16 on the substrates 11 through 14.

The liquid crystal display 10 has a red display layer R, a green display layer G and a blue display layer B which are placed one upon another in this order on a light absorber 20. The red display layer R makes a display by switching between a red selective reflection state and a transparent state. The green display layer G makes a display by switching between a green selective reflection state and a transparent state. The blue display layer B makes a display by switching between a blue selective reflection state and a transparent state.

In the liquid crystal display 10, the liquid crystal performs selective reflection when it is in a planar state and becomes transparent when it is in a focal-conic state. By switching the liquid crystal between these states, the liquid crystal display 10 makes a display. When the liquid crystal is in a planar state, it selectively reflects light of a wavelength λ=Pn (P: helical pitch of the cholesteric liquid crystal, n: average refractive index of the liquid crystal).

If the wavelength of light selectively reflected by the cholesteric liquid crystal is within the infrared spectrum, when the liquid crystal is in a focal-conic state, it scatters visible light. If the wavelength of light selectively reflected by the cholesteric liquid crystal is shorter than the infrared spectrum, the liquid crystal, in a focal-conic state, transmits visible light. Accordingly, by providing a light absorber 20 on the side of the liquid crystal display 10 opposite the observing side (indicated by arrow "A") and by setting the wavelength of light selectively reflected by the liquid crystal within the visible spectrum, display of a specified color (made in a planar state) and black (made in a focal-conic state) is possible. Also, by setting the wavelength of light selectively reflected by the liquid crystal within the infrared spectrum, display of black (made in a planar state) and white (made in a focal-conic state) is possible.

By applying a voltage of a first threshold value $Vth1$ which is the threshold voltage to untwist the cholesteric liquid crystal for a sufficient time and thereafter dropping the voltage lower than a second threshold value $Vth2$ which is smaller than $Vth1$, the liquid crystal comes to a planar state. Also, by applying a voltage higher than $Vth2$ and lower than $Vth1$ to the liquid crystal for a sufficient time, the liquid crystal comes to a focal-conic state. These states can be maintained even after application of a voltage is discontinued It has been known that there is a state where these two states are mixed and that a display of intermediate tones is possible (refer to U.S. Pat. No. 5,384,067).

Figures 3, 4:
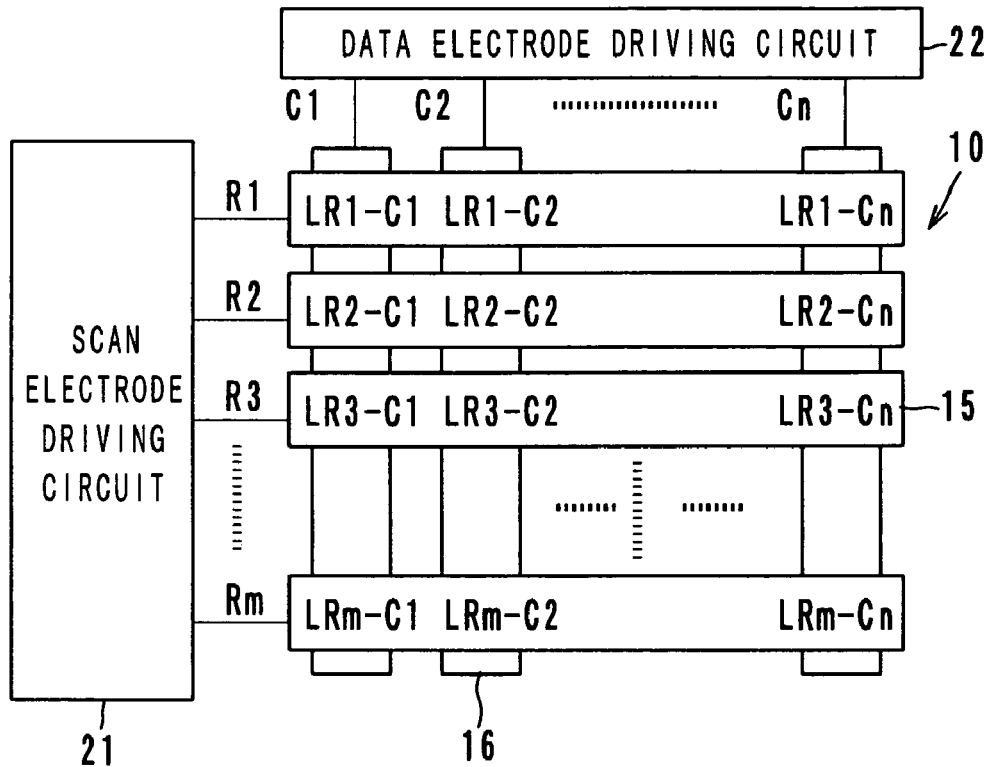
FIG. 3 is a block diagram showing a driving circuit of the liquid crystal display.
FIG. 4 is an illustration of a driving method of the liquid crystal display.

As FIG. 3 shows, the pixels of the liquid crystal display 10 are structured in a matrix composed of a plurality of scan electrodes R1, R2 through Rm and data electrodes C1, C2 through Cn (m, n: natural numbers). The scan electrodes R1 through Rm are connected to output terminals of a scan electrode driving circuit 21, and the data electrodes C1 through Cn are connected to output terminals of a data electrode driving circuit 22.

The scan electrode driving circuit 21 outputs a selective signal to specified ones of the scan electrodes R1 through Rm so as to set the specified scan electrodes to a selected state while outputting a non-selective signal to the other scan electrodes so as to set the other scan electrodes to a non-selected state. The scan electrode driving circuit 21 outputs the selective signal to the scan electrodes R1 through Rm in order while switching at regular intervals. In the meantime, the data electrode driving circuit 22 outputs a signal in accordance with image data to the data electrodes C1 through Cn for rewriting of the pixels on the scan electrodes in a selected state. For example, when a scanning electrode Ra (a: natural number, a≦m) is selected, displayed information on the pixels LRa-C1 through LRa-Cn at the intersections of the scanning electrode Ra and the data electrodes C1 through Cn is rewritten. Thus, in each pixel, the difference between the voltage applied to the scan electrode and the voltage applied to the data electrode is a rewriting voltage, and each pixel is rewritten in accordance with this rewriting voltage.

Referring to FIG. 4, displaying an image of which image data are expressed by a matrix [Pij] composed of m rows and n columns is described. First, a pulse voltage in accordance with data for the first line indicated by row vectors P11, P12 . . . P1n is applied to the data electrodes C1, C2 . . . Cn, while only the scan electrode R1 selected from the scan electrodes R1 through Rm is charged to a specified voltage. Thereby, the pixels in the first line, namely, L11, L12 . . . L1n come to a planar state or to a focal-conic state. Thereafter, when the application of voltage to the scan electrode Ra is stopped, the display states of the pixels L11, L12 . . . L1n are maintained.

In the same way, a pulse voltage in accordance with data for the "i"th line indicated by row vectors Pi1, Pi2 . . . Pin is applied to the data electrodes C1, C2 . . . Cn, while only the scan electrode Ri selected from the scan electrodes R1 through Rm is charged to the specified voltage. Thereby, the pixels in the "i"th line, namely, Li1, Li2 . . . Lin come to a planar state or to a focal-conic state. Thereafter, when the application of voltage to the scan electrode Ri is stopped, the display states of the pixels Li1, Li2, . . . Lin are maintained. By applying this procedure to all the "i" (1≦i≦m) lines repeatedly, the image [Pij] is completely displayed, and the display state is maintained.

By carrying out the above-described matrix drive toward the display layers B, G and R in order or simultaneously, a full-color image can be displayed on the liquid crystal display 10. Further, by driving the liquid crystal with the image data [Pij] changed as time goes by, display of a motion picture is possible.

Materials for Liquid Crystal Display and Producing Method Thereof

As the transparent substrates, transparent glass substrates and polymer films can be used. The polymer films mean, for example, resin such as polyether sulfone, polycarbonate, polyethylene terephtalate.

As the electrodes, transparent electrodes such as ITO, NESA coat, etc. are usable, and such a material is formed into the electrodes by sputtering or vapor deposition. The lowermost electrodes may be black electrodes so as to also function as a light absorber.

As the liquid crystal composition, it is preferred to use a material which exhibits a cholesteric phase at a room temperature. What is suited as the material is chiral nematic liquid crystal which is produced by adding a chiral agent to nematic liquid crystal. Although nematic liquid crystal is not limited to the followings, mixtures mainly containing liquid crystalline tolan compounds, liquid crystalline pyrimidine compounds, liquid crystalline ester compounds, liquid crystalline cyano biphenyl compounds, liquid crystalline phenylcyclohexyl compounds, liquid crystalline tarphenyl compounds or mixtures of these compounds can be named as specific examples of nematic liquid crystal. Various coloring agents, e.g. dichroic dyes may be added to the liquid crystal composition.

As the columnar structure, for example, thermoplastic resin is usable. The requirements as the material of the columnar structure are to be softened by heating and hardened by cooling, not to chemically react to the liquid crystal material and to have appropriate elasticity. Although the columnar structure serves as a spacer to maintain the gap between the substrates, spherical spacers made of an inorganic material, which are conventionally used, may be also used as well as the columnar structure.

Structure of Memory Card with Memory-Effective Liquid Crystal

There are two types of memory cards which have a display section using liquid crystal with a memory effect, namely, a memory section/display section integrated type and a memory section/display section separate type.

Memory Section/Display Section Integrated Type

Figure 5:
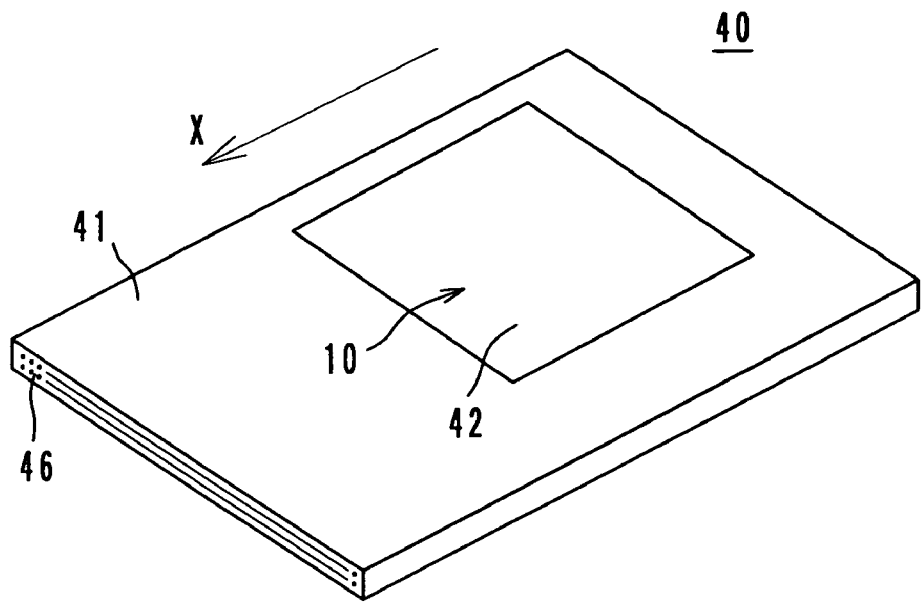
FIG. 5 is a perspective view of a first memory card which is used for an electronic information device according to the present invention.
Figure 6:
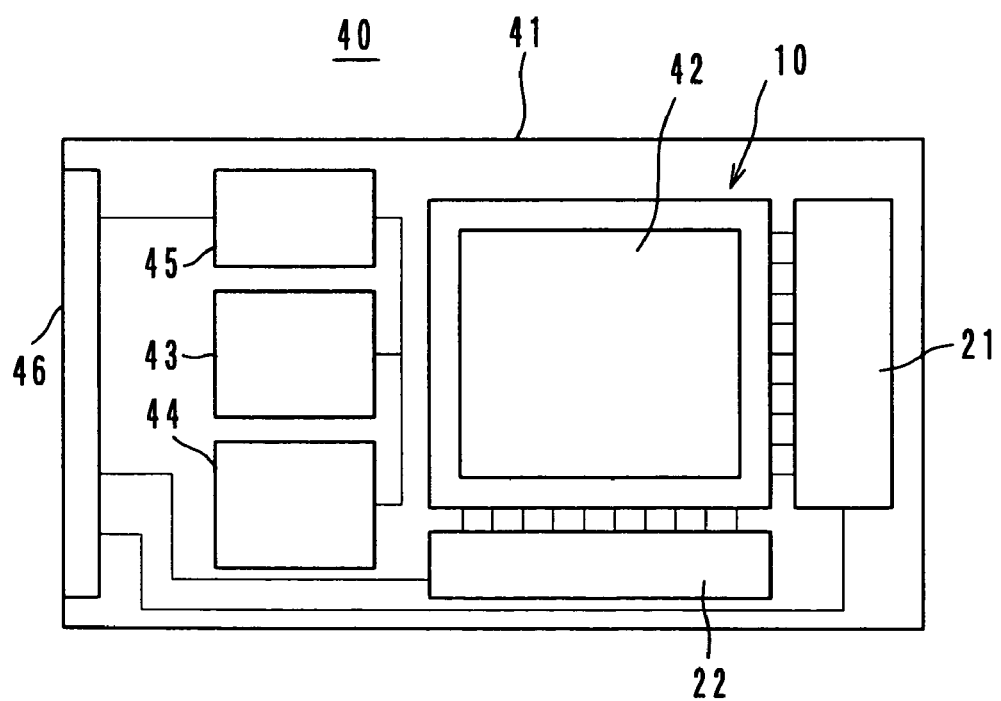
FIG. 6 is a block diagram showing a circuitry of the memory card.

FIGS. 5 and 6 show a memory card 40 which is based on the PCMCIA type 2 standard. On a substrate (not shown) in a metal card case 41, flash memories 43, 44, a driving circuit 45 comprising an address decoder, the above-described liquid crystal display 10 and its driving circuits 21 and 22 are arranged. On the liquid crystal display 10, a transparent plastic window 42 is provided. On an end surface of the case 41, a connector 46 of the PCMCIA standard is provided. When this memory card 40 is used, it is fitted in an electronic information device with a connector of the PCMCIA standard, such as a digital camera, a personal computer or the like, in the direction "X".

Electric power is supplied to the memory card 40 from the electronic information device. However, because the display section comprises liquid crystal with a memory effect, even when the memory card 40 is taken out of the electronic information device and is not supplied with electric power, the liquid crystal display 10 is capable of keeping a display thereon. Descriptions of display modes will be given later. The connector 46 functions not only to input and output electric power and a signal to and from the memory section but also to input and output electric power and a drive signal to and from the driving circuits 21 and 22 of the liquid crystal display 10.

Memory Section/Display Section Separate Type

The memory section/display section separate type memory cards can be further divided into two type, namely, an adapter type which permits use of conventional memory cards (without the liquid crystal display 10) and a display section sticking type which facilitates an exchange of liquid crystal displays when the liquid crystal display 10 ages and degrades.

Adapter Type

Figure 7:
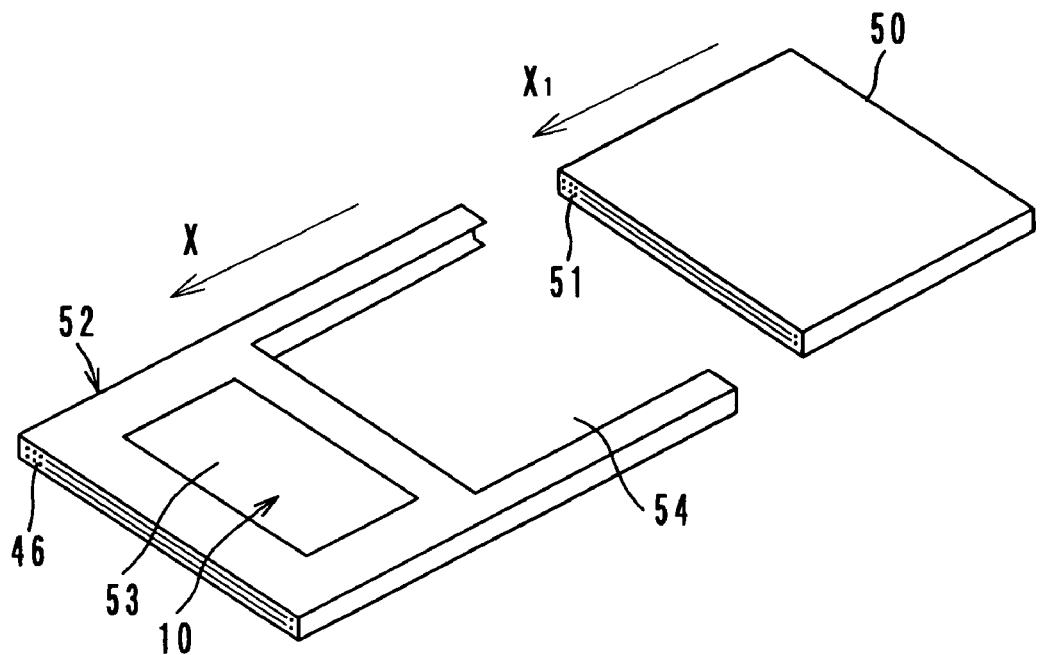
FIG. 7 is a perspective view of a second memory card.
Figure 8:
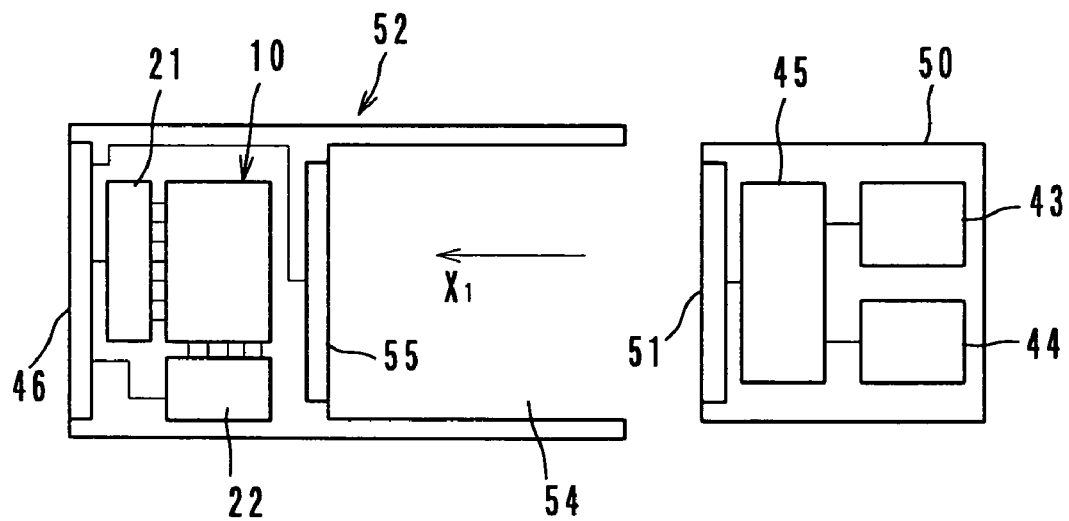
FIG. 8 is a block diagram showing a circuitry of the memory card shown by FIG. 7.

FIGS. 7 and 8 show a compact flash memory card 50 which is widely used as a data storage medium for a digital camera and a PC card adapter 52 for the memory card 50. The PC card adapter is provided with the above-described liquid crystal display 10. The picture on the display 10 can be seen through a transparent plastic window 53. The memory card 50 is fitted in a frame 54 of the adapter 52 in the direction "X$_1$". Thereby, a connector 51 connected to the driving circuit 45 comes in contact with a connector 55 provided on the adapter 52. The connector 55 is connected to a connector 46 which is provided on an end surface of the adapter 52. In FIGS. 7 and 8, the same members are denoted by the same reference symbols as those in FIGS. 5 and 6.

Display Section Sticking Type

As FIG. 9b shows, on a surface of a casing 57 of a compact flash memory card 56, a recess 58 in which a display section is to be placed is formed. In the recess 58, electrodes 59 for a drive of the display section are formed. The liquid crystal display 10 is joined to a support 25 integrally. On the reverse side of the support 25, electrodes 26 which are electrically connected to the driving circuits 21 and 22 are formed. When the center portion of the reverse side of the support 25 is stuck to the recess 58 by a double-side sticky tape or an adhesive, the electrodes 26 and 59 are electrically connected to each other.

The recess 58 has a projection 58a, and the support 25 has a cut-out 25a. In fitting the liquid crystal display 10 in the casing 57, the cut-out 25a must be engaged with the projection 58a, and there is no possibility that the liquid crystal display 10 may be fitted in a wrong way. The support 25 is slightly smaller than the recess 58. The depth of the recess 58, the thickness of the electrodes 26 and 59, the thickness of the support 25 and the thickness of the display 10 are so designed that the surface of the display 10 will be on a level with the surface of the memory card 56 when the display 10 is fitted in the memory card 56. Therefore, there is no fear that the liquid crystal display 10 may come off when this memory card 56 is fitted in a digital camera or a personal computer. Also, when the display section is to be changed because of aging or damage of the liquid crystal or by any reason, the changing work is easy.

The display section may be inserted in the memory card through a slot. FIGS. 10 and 11 show an example of this way of fastening the display section to the memory card. In a casing 61 of a compact flash memory card 60, a slot 62 is provided on the opposite side to the side where the connector 46 is provided. A display section, which comprises a support 27 and the above-described liquid crystal display 10 fitted thereon, is inserted in the memory card 60 through the slot 62. By inserting the display section in the direction "X$_1$" through the slot 62 to the end, the electrodes 26 of the liquid crystal display 10 are electrically connected to the electrodes 59 (see FIG. 12) provided in the casing 61.

On a surface of the casing 61, a transparent plastic window 63 is provided in a portion where the liquid crystal display 10 is to be placed. Thus, when the display section is inserted in the memory card 60, it can be used as a memory card with memorizable liquid crystal. Further, a lever 64 is provided on the casing 61 so that the display section can be taken out of the slot 62. This take-out mechanism comprising the lever 64 is of a conventional type for a slot of the PCMCIA standard, and a description thereof is omitted.

Figure 12:
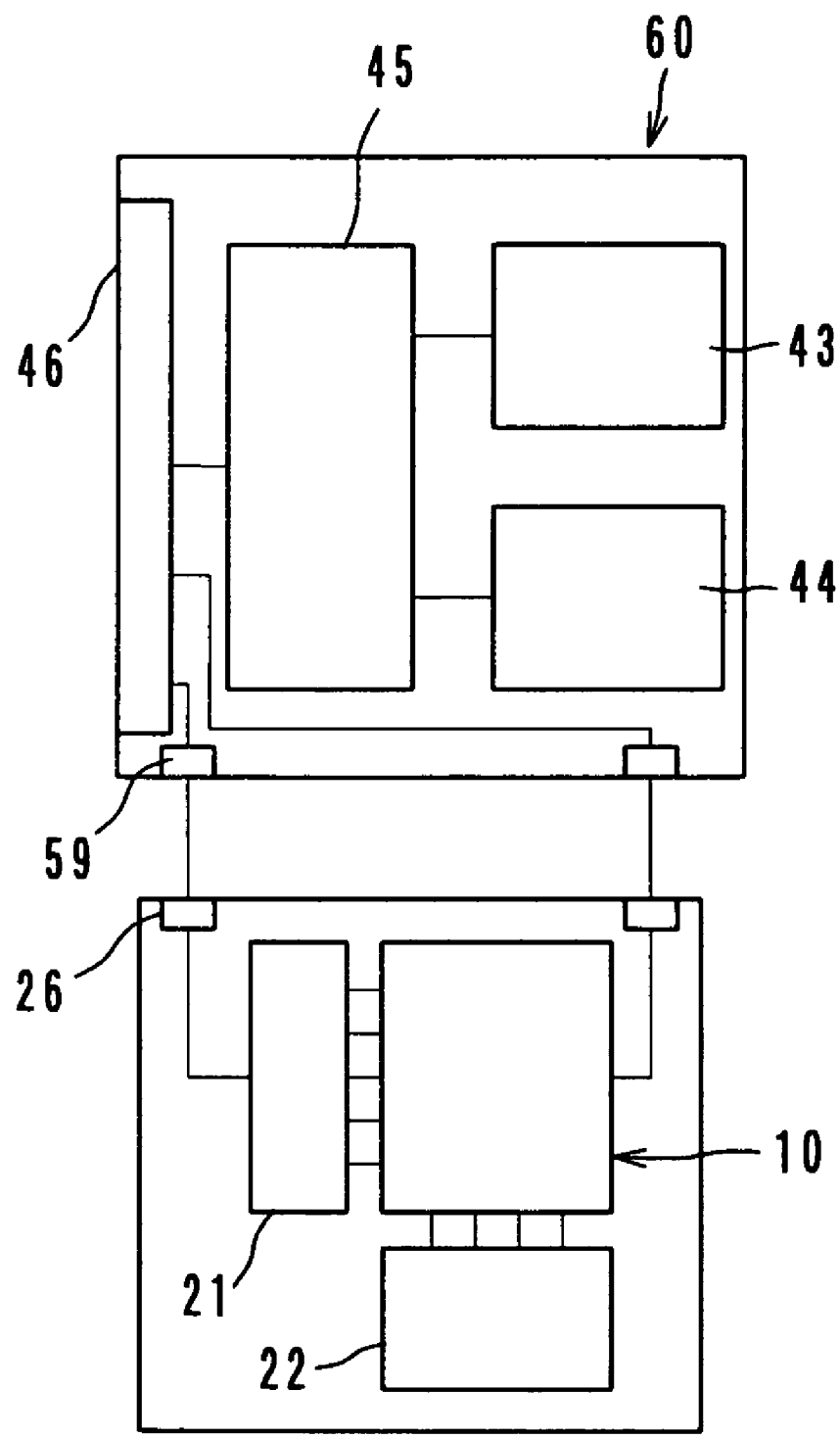
FIG. 12 is a block diagram of a circuitry of the memory cards shown by FIGS. 9 and 10.

FIG. 12 shows a circuit of a memory card of the memory section/display section separate type as shown by FIGS. 9 and 10. The same members of the circuit shown by FIG. 12 are denoted by the same reference symbols as those in FIG. 6, and descriptions of these members are omitted.

Driving Circuit

Figure 13:
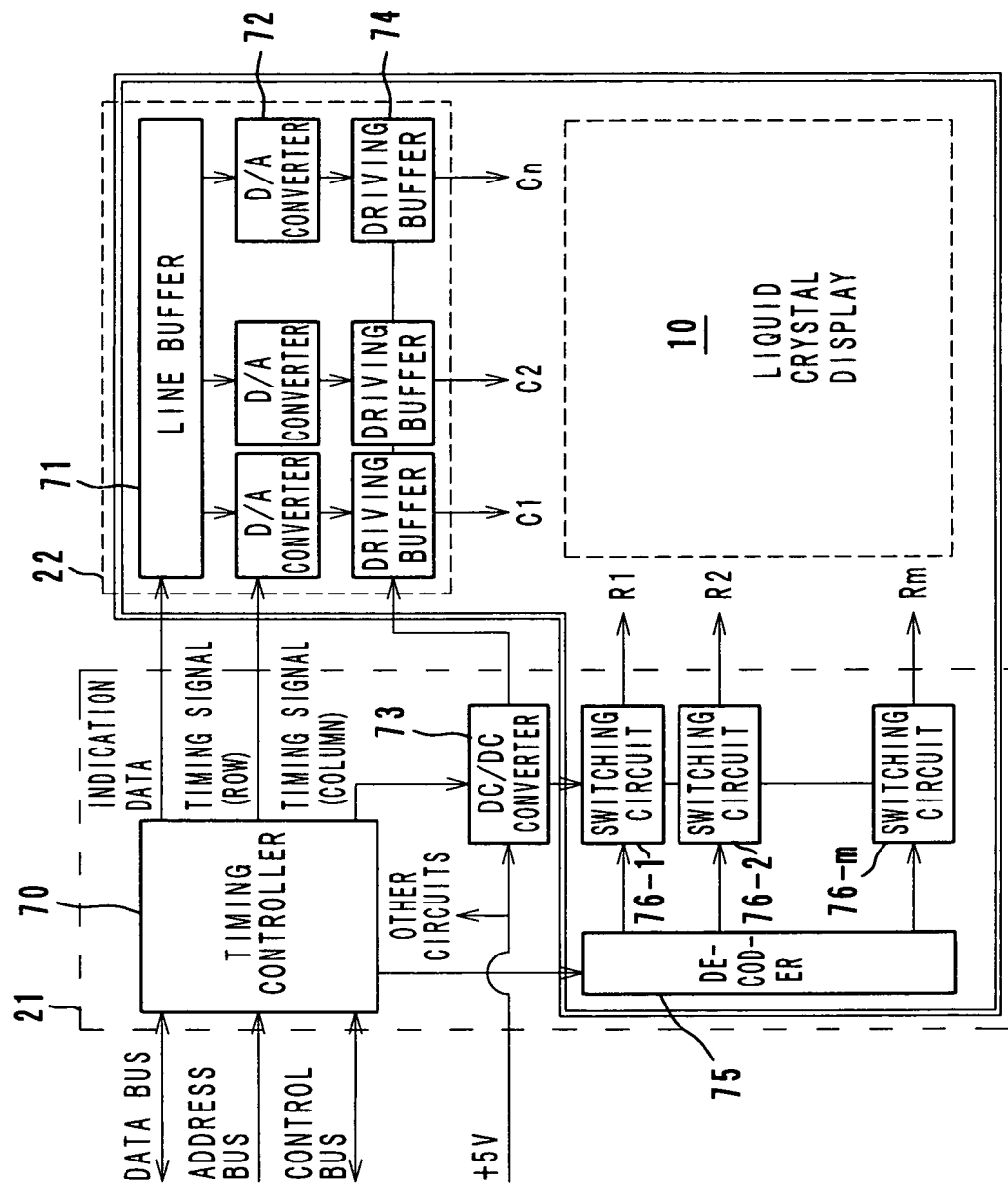
FIG. 13 is a block diagram showing a driving circuit of the liquid crystal display.

Now referring to FIG. 13, a mechanism of displaying the content of image data on the liquid crystal display 10, especially the scan electrode driving circuit 21 and the data electrode driving circuit 22 are described in detail. FIG. 13 shows the members working for a drive of the liquid crystal display 10. Although the flash memories 43 and 44 are actually installed in the memory card, a driving circuit for the memories 43 and 44 is well-known, and a description thereof is omitted.

The memory card with memory-effective liquid crystal is based on the PCMCIA standard which is controlled by a CPU of a digital camera, a personal computer or the like via a card interface. Accordingly, the memory card has four terminals, namely, a data bus, an address bus, a control bus and a power/grounding line although they are not shown. When an image is displayed on the liquid crystal display 10, a CPU of a digital camera, a personal computer or the like dispatches a writing command to the control bus, designates an address and outputs data.

In accordance with the output of data, first, image data for the first line are stored in a line buffer 71. A timing controller 70 times so that on completion of the storage, the image data for the first line can be read out simultaneously for the respective columns and converted from eight-bit data into analog image signals by D/A converters 72.

From an electric power source of the digital camera or the personal computer, a voltage of +5V is applied to this driving circuit via the memory card interface. In driving the liquid crystal display 10, however, in order to cause the liquid crystal to come to a focal-conic state or a planar state, the voltage difference between the electrodes must be a specified value. Therefore, the voltage is raised to a specified value by a DC/DC converter 73 and then supplied to driving buffers 74. Thereby, the driving buffers 74 amplify the analog image signals sent from the D/A converters 72 and send the amplified signals to the electrode columns C1, C2 . . . Cn.

In the meantime, the timing controller 70, at the timing of displaying image data for the first line, sends a command to a decoder 75 to turn on only a switching circuit 76-1 and turn off the other switching circuits. When only the switching circuit 76-1 is turned on, the output of the DC/DC converter 73 is applied to only the electrode row R1. Thereby, only the first line corresponding to the first electrode row becomes a display state in accordance with the image data. Because the liquid crystal has a memory effect, even after stoppage of the application of voltage, the display state is maintained.

In the same manner, in displaying image data for the "i"th line ($1 \leq i \leq m$), in response to a timing signal (column direction), the image data for the "i"th line is stored in the line buffer 71. On completion of the storage, the image data for the "i"th line are read out simultaneously for the respective columns. The eight-bit image data are converted into analog image signals by the D/A converters 72. The driving buffers 74 amplify the analog image signals outputted from the D/A converters 72, and the amplified signals are sent to the electrode columns C1, C2 . . . Cn.

In the meantime, the timing controller 70, at the timing of displaying the image data for the "i"th line, sends a command to the decoder 75 to turn on only a switching circuit 76-i and to turn off the other switching circuits. Accordingly, the output from the DC/DC converter 73 is sent to only the electrode row Ri. Thereby, only the "i"th line corresponding to the electrode row Ri comes to a display state, and even after stoppage of the application of voltage, the display state is maintained.

Such a driving process is repeated to display a whole picture, and if a command of displaying a new picture is dispatched, the same process is repeated from the first line to the last line to display the picture.

As described above, the data electrode driving circuit 22 comprises the line buffer 71, the D/A converters 72, and the driving buffers 74, and the scan electrode driving circuit 21 comprises the timing controller 70, the DC/DC converter 73, the decoder 75 and the switching circuits 76-1 through 76-$m$. The timing controller 70 and the DC/DC converter 73 may be included in the data electrode driving circuit 22. Further, it is not difficult to structure these circuits 21 and 22 in one chip. Since the liquid crystal display 10 is a full-color display, three channels of such driving circuits 21 and 22 (for R, G and B) are necessary. Actually, therefore, three sets of the data electrode driving circuit 22, the decoder 75, the switching circuits 76-1 through 76-$m$ are provided, and these are controlled by the single timing controller 70.

Incidentally, since such a memory card is an exchangeable storage medium toward electronic information equipment, there are two types with respect to its driving section: a driving section internally installed type which has a driving section inside the memory card itself; and a driving section externally installed type which has part of its driving section which is also used for electronic information equipment installed outside the memory card.

Driving Section Internally Installed Type

The driving section internally installed type means that the whole driving circuit for the liquid crystal display 10 is installed in the memory card. Accordingly, by receiving only RGB data from outside, the liquid crystal display 10 can make a complete picture thereon. This requires easy control. In a case of using an interface for general use such as the PCMCIA standard as described above, this type must be used.

Driving Section Externally Installed Type

The driving section externally installed type means that part of the driving circuit for the liquid crystal display 10 is installed in a device such as a digital camera, a personal computer or the like in which the memory card is to be inserted when it is used. Accordingly, this decreases the size and the cost of the memory card.

In the driving circuit shown by FIG. 13, it is preferred to install the part which is enclosed by a double line in the memory card. The other part can be installed in a digital camera, a personal computer or the like. By installing at least the part enclosed by the double line in the memory card, even if a larger number of electrodes become necessary with an increase in number of the display pixels, the number of pins of the connector may not be increased so much.

Digital Camera which can Employ Memory Card with Memory-Effective Liquid Crystal A digital camera which can employ the above-described memory card with memory-effective liquid crystal as a storage medium of photo data.

Since the memory card has a display section, it is possible to display any information about the digital camera on the display section of the memory card. First, however, a type which further has a display section for the digital camera besides the display section of the memory card is described.

Display Section Separate Type Structure of Digital Camera

In FIGS. 14 through 17, a digital camera 100 comprises a camera body 102 and an image pick-up unit 103. The image pick-up unit 103 is attached to the right side of the camera body 102 viewed from the front side and is detachable from the camera body 102.

The image pick-up unit 103 has a conventional CCD 303 which functions as a color area sensor (see FIG. 18) at a suitable place in the rear side of a zoom lens 301 with a macro function. As in a camera using a silver salt film, a light-adjusting circuit 304 with a light-adjusting sensor 305 which receives reflection of flash light from an object, a distance sensor 306 which measures the distance to an object and an optical finder 307 are provided at suitable places inside the image pick-up unit 103.

In the image pick-up unit 103, also, a zoom motor M1 (see FIG. 18), which moves the zoom lens 301 for a change in zoom ratio and for movement between a retreating position and a photography position, and a motor M2, which carries out focusing, are provided.

On the front side of the camera body 102, a grip 104, a built-in flash 105 and an IRDA port 106 which performs infrared communication between the digital camera 100 and an external device (for example, another digital camera, a personal computer or the like) are provided. On the upper side of the camera body 102, a shutter button 109 is provided.

As FIG. 15 shows, on the rear side of the camera body 102, an LCD section 110, which makes a monitor display (corresponding to a viewfinder) and reproduces a stored image, is provided in the center. Below the LCD section 110, a key switch group 111 for control of the digital camera 100 and a power switch 112 are provided. On the left side of the power switch 112, an LED 113, which is lit when the power switch 112 is on, and an LED 114, which indicates the middle of an access to the memory card, are provided.

Further, on the rear side of the camera body 102, a photography/reproduction mode setting switch 120 for switching between a photography mode and a reproduction mode is provided. The photography mode is to take a photograph, and the reproduction mode is to reproduce an image stored in the memory card on the LCD section 110. The photography/reproduction mode setting switch 120 is a two-contact slide switch. For example, by sliding the switch 120 downward, the reproduction mode is set, and by sliding the switch 120 upward, the photography mode is set.

On the rear side of the camera body 102, in the right side, a four-throw switch is provided. By pressing buttons 121 and 122 of the four-throw switch, the zoom motor M1 is driven for zooming, and by pressing buttons 123 and 124 of the four-throw switch, exposure adjustment is performed.

As shown in FIG. 15, on the rear side of the image pick-up unit 103, an LCD button 311 and a macro button 312 are provided. Every time the LCD button 311 is pressed, the LCD section 110 is turned on or off. For example, in taking photographs while using only the optical finder 307, the LCD section 110 shall be turned off to save energy. By pressing the macro button 312, the focus motor M2 is driven to permit macro imaging of the lens 301.

Figure 16:
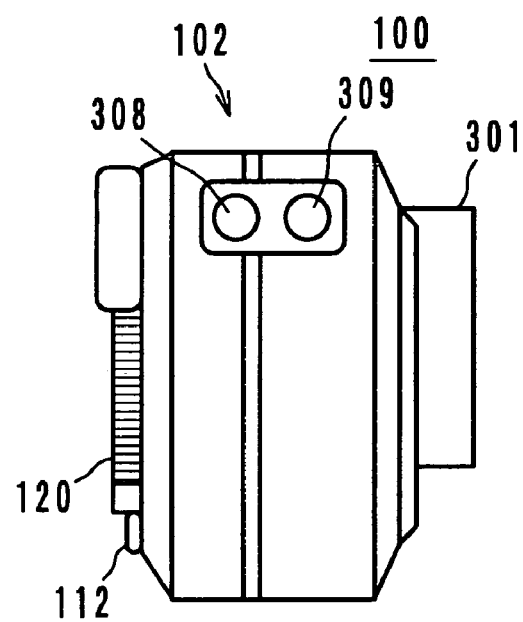
FIG. 16 is a side view of the digital camera.

As FIG. 16 shows, on a side of the digital camera 100, a DC input terminal 308 and a video output terminal 309 are provided. The video output terminal 309 is to output an image displayed on the LCD section 110 to an external video monitor.

Figure 17:
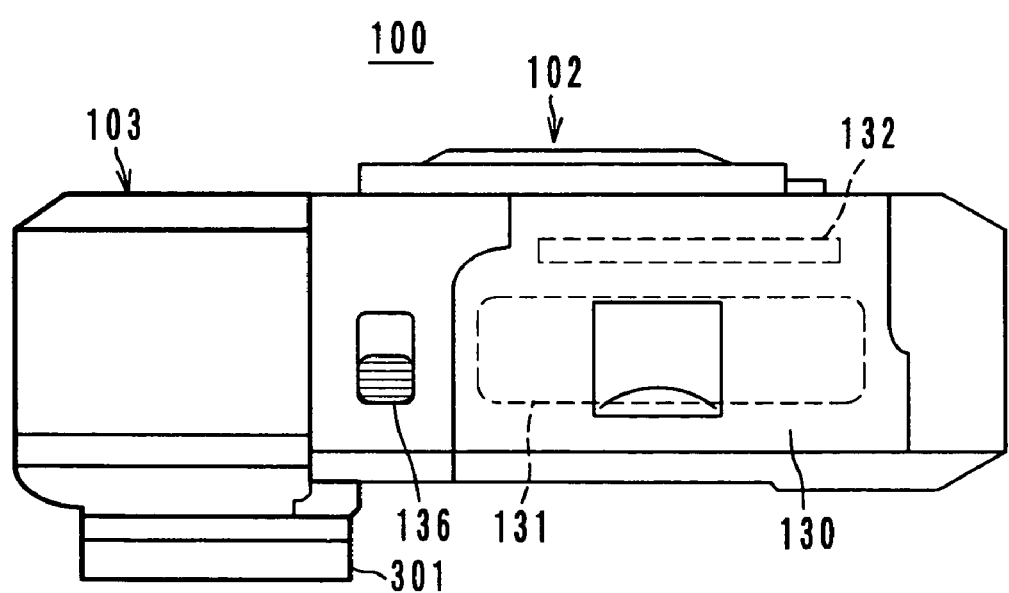
FIG. 17 is a bottom view of the digital camera.

As FIG. 17 shows, on the bottom of the camera body 120, a battery room 131 and a card room 132 for a memory card are provided, and these rooms are closed by a clamshell type cover 130. This digital camera 100 requires four AA batteries which are serially connected as its driving source 135. Further, on the bottom side, a disconnecting lever 136, to disconnect the image pick-up unit 103 and the camera body 102 which are connected by a connector and a hook from each other, is provided.

Control Circuit

Figure 18:
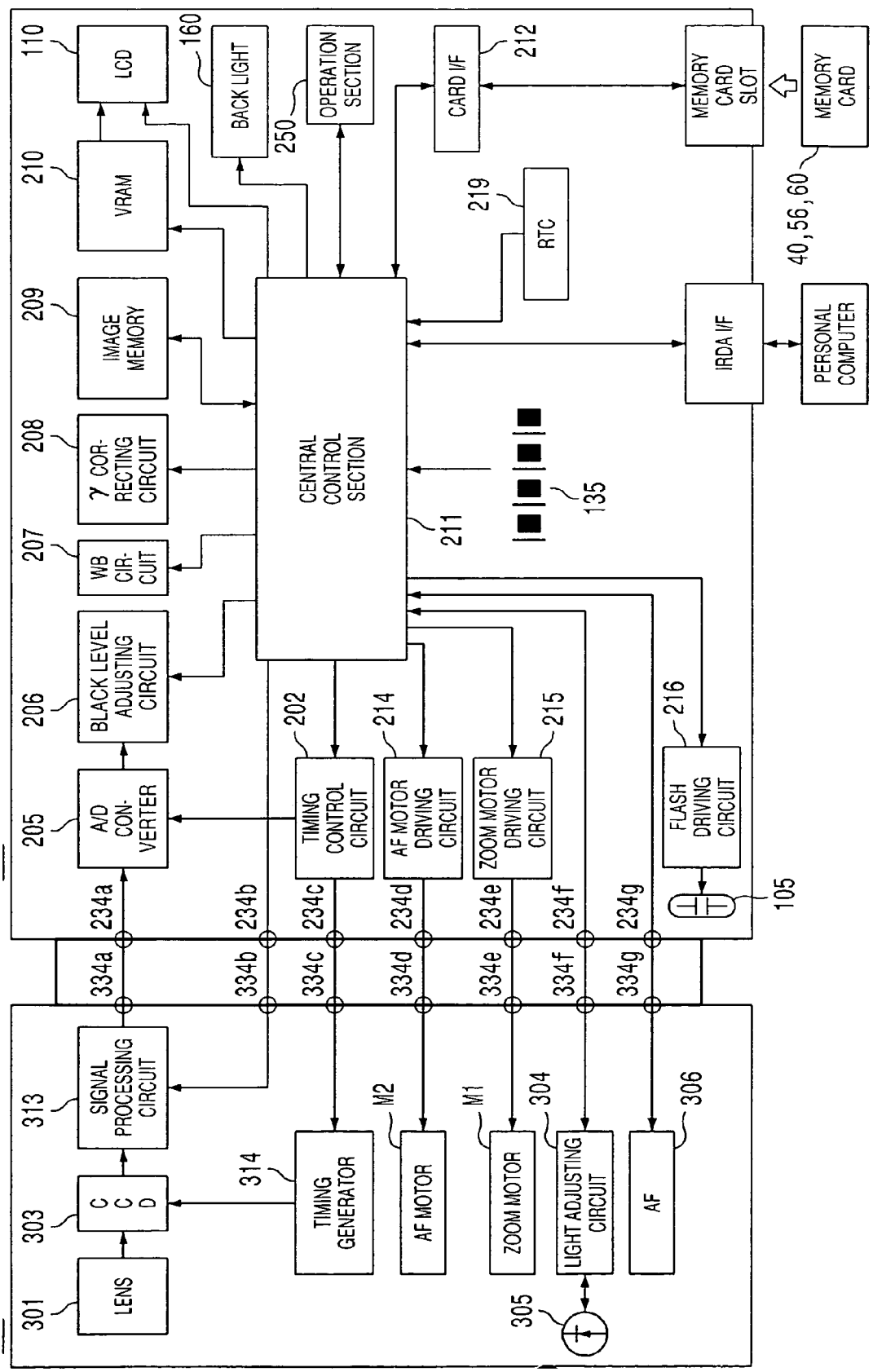
FIG. 18 is a block diagram showing a control circuit of the digital camera.

Next, referring to FIG. 18, a control circuit of the image pick-up unit 103 is described.

The CCD 303 performs photoelectric conversion of an optical image of an object which has been obtained by the macrozoom lens 301 to output color image signals of R, G and B (signals each of which is composed of rows of pixel data). A timing generator 314 generates various timing pulses for control of the CCD 303.

In the image pick-up unit 103, since the stop is fixed, the exposure adjustment is performed by adjusting the exposure of the CCD 303 and more specifically by adjusting the charging time of the CCD 303 corresponding to the shutter speed. When it is impossible to set an appropriate shutter speed because the luminance of the object is low, inappropriate exposure because of lack of exposure is corrected by adjusting the levels of the image signals outputted from the CCD 303. Thus, when the luminance is low, both shutter speed and gain are adjusted for exposure control. The adjustment of the levels of the image signals is carried out by gain control in an AGC circuit in a signal processing circuit 313.

The timing generator 314 generates a driving control signal of the CCD 303 based on a reference clock sent from a timing control circuit 202. For example, the timing generator 314 generates clock signals such as a timing signal for a start/stop of integration (a start/stop of exposure), a pixel data reading control signal (a horizontal synchronous signal, a vertical synchronous signal, a transmission signal or the like), etc. and outputs these signals to the CCD 303.

The signal processing circuit 313 performs specified analog signal processing toward each image signal (analog signal) outputted from the CCD 303. This signal processing circuit 313 has a CDS (correlated double sampling) circuit and an AGC (auto gain control) circuit. In the CDS circuit, the noise of the image signals is reduced, and by controlling the gain in the AGC circuit, the levels of the image signals are adjusted.

The light-adjusting circuit 304 controls the quantity of light emitted from the built-in flash 105 to emit a quantity of light which is predetermined by a central control section 211. In flash photography, simultaneously with a start of exposure, the sensor 305 starts receiving reflected light from an object irradiated by flash light, and when the quantity of light received by the sensor 305 reaches a specified value, a lighting stop signal is outputted from the demodulating circuit 304. A flash driving circuit 216 stops light emission of the built-in flash 105 in response to the lighting stop signal. Thus, the quantity of light emitted from the flash 105 is controlled.

The image pick-up unit 103 and the camera body 102 are electrically connected to each other by seven connector groups 334a, 334b, 334c, 334d, 334e, 334f and 334g which are provided on the fitting surface 334 of the image pick-up unit 103 and by seven connector groups 234a, 234b, 234c, 234d, 234e, 234f and 234g which are provided on the connecting surface 234 of the camera body 102.

Next, a control circuit of the camera body 102 is described.

In the camera body 102, an A/D converter 205 converts each signal for a pixel of the image signals into a ten-bit digital signal. Based on an A/D conversion clock sent from the timing control circuit 202, each pixel signal (analog signal) is converted into a 10-bit digital signal.

The timing control circuit 202 generates a reference clock and clocks to be outputted to the timing generator 314 and the A/D converter 205 and is controlled by the central control section 211.

A black level adjusting circuit 206 adjusts the black level of the A/D converted pixel signal (hereinafter referred to as pixel data) to a specified black level. A WB circuit 207 changes the levels of the pixel data of the respective colors R, G and B so that the white balance will be appropriate after γ correction. The WB circuit 207 uses a level conversion table sent from the central control section 211 in changing the levels of the RGB color pixel data. The conversion coefficients (inclinations of characteristics) for the respective colors in the level conversion table are determined by the central control section 211 for every photography.

A γ correcting circuit 208 is to correct the γ characteristic of pixel data. An image memory 209 is to be stored with pixel data outputted from the γ correcting circuit 208. The image memory 209 has a storage capacity for one-frame data. More specifically, if the CCD 303 has pixels arranged in n columns and in m rows, the image memory 209 has a capacity of pixel data for n×m pixels, and data for the respective pixels are stored in respective places in the memory 209.

A VRAM 210 is a buffer memory for image data to be reproduced on the LCD section 110. This VRAM 210 has a storage capacity of image data corresponding to the number of pixels of the LCD section 110.

During a stand-by for photography, images are picked up by the image pick-up unit 103 at regular time intervals. Pixel data of each picked-up images are subjected to specified signal processing by the A/D converter 205 through the γ correcting circuit 208 and stored in the image memory 209. Simultaneously, the data are transmitted to the VRAM 210 via the central control section 211 to be displayed on the LCD section 110 (display of a live view image). From the image displayed on the LCD section 110, the user can obtain a vision of the object. In the reproduction mode, image data read out from the memory card are subjected to specified signal processing at the central control section 211, and the data are transmitted to the VRAM 210 to be displayed on the LCD section 110.

A card I/F 212 is an interface for recording and reading of image data to and from the memory card.

The flash driving circuit 216 is to control light emission of the built-in flash 105. This driving circuit 216 controls the necessity of light emission of the built-in flash 105, the quantity of light to be emitted, the timing of light emission, etc. based on a control signal sent from the central control section 211, and the quantity of emitted light is controlled specifically based on the light emission stop signal sent from the light-adjusting circuit 304. An RTC 219 is a clock circuit which manages the date and time of photography and is driven by another electric power source (not shown). An operation section 250 means the above-described various keys, switches and buttons.

Incidentally, the shutter button 109 is, like one employed in a camera using a silver-salt film, a two-level switch which has a half-pressed state S1 and a full-pressed state S2. During a stand-by, when the shutter button 109 is pressed half-way (S1), distance information detected by the distance sensor 306 is inputted to the central control section 211. The central control section 211 drives the AF motor M2 based on this distance information to move the zoom lens 301 for focusing.

The central control section 211 is a CPU to organize photography operation of the digital camera 100 by integrally controlling drives of the members in the image pick-up unit 103 and in the camera body 102. The central control section 211 is connected to the peripheral circuits by address buses, data buses and control buses. In FIG. 18, the arrows are used for convenience to show the flows of signals and image data. Actually, image data are sent to the respective circuits via the central control circuit 211, and therefore, the central control section 211 is provided with a ROM (not shown) to be stored with a work memory and a program.

Also, the central control section 211 has a luminance judging section and a shutter speed setting section to determine the exposure value (shutter speed). The luminance judging section judges the brightness of an object using images picked up by the CCD 303 at intervals of 1/30 second during a stand by for photography. In other words, the luminance judging section judges the brightness of an object using image data which are renewably stored in the image memory 209. The shutter speed setting section sets a shutter speed (integrated time of the CCD 303) based on the judgment of the luminance judging section.

Further, the central control section 211 has a filter section which performs a filtering treatment for recording of a photographed image, an image recording section which produces a thumbnail image and a compressed image and an image reproducing section which reproduces an image to be displayed on the LCD section 110 from data stored in the memory card.

The filter section adjusts the high-frequency component of an image to be recorded by a digital filter so as to correct the picture quality with respect to the outline.

The image recording section reads pixel data from the image memory 209 and produces a thumbnail image and a compressed image to be stored in the memory card. The image recording section reads data of every eight pixels in the horizontal direction and in the vertical direction while scanning the image memory 209 in a raster scanning direction and transmits the pixel data to the memory card in order, whereby a thumbnail image is produced and recorded in the memory card.

The image recording section reads all the pixel data of one image from the image memory 209 and performs two-dimensional DCT conversion and a compression treatment based on a JPEG method, such as a Huffman encoding method, toward the pixel data to produce data for a compressed image. Then, the compressed image data are recorded in an image area of the memory card.

In the photography mode, when the shutter button 109 is pressed for a command of photography, the central control section 211 processes the image which has been photographed and taken in the image memory 209 to a thumbnail image and a compressed image by applying a compression treatment based on the JPEG method at a ratio set by a compression ratio setting switch. Then, the compressed image is stored in the memory card with tag information about the photographed image (frame number, exposure value, shutter speed, compression ratio, date of photography, on/off of the flash, scene information, result of judgment of the image, etc.).

In each frame of the digital camera 100, tag data, high-resolution image data compressed based on the JPEG method (1600×1200 pixels) and thumbnail image data (80×60 pixels) are recorded. The volume of data recorded in one frame is approximately 1 MB.

When the photography/reproduction mode setting switch 120 is set to the reproduction mode, image data in the frame of the highest number are read out of the image memory, and the data are expanded by the image reproducing section. Then, the expanded data are transmitted to the VRAM 210, whereby the image in the frame of the highest number, that is, the latest photographed image is displayed on the LCD section 110. By operating an UP switch 111a, an image in the higher frame number is displayed, and by operating a DOWN switch 111b, an image in the lower frame number is displayed.

Display Sequence of Liquid Crystal Display

An exemplary sequence of displaying data on the liquid crystal display 10 of a display section separate type digital camera is described.

(1) Renewal of Image on Card

The memory card 56 shown by FIG. 9, which is of a memory section/display section separate type and of a driving section internally installed type, is shown by FIGS.

19 and 20 again and is described as an exemplary memory card fitted in the digital camera 100. As mentioned above, the memory card 56 is compatible with conventional ordinary memory cards. The liquid crystal display 10 comprises 300 pixels in each row and 400 pixels in each column, and the electrodes 15 and 16 are formed in accordance with the arrangement of the pixels.

Figure 19:
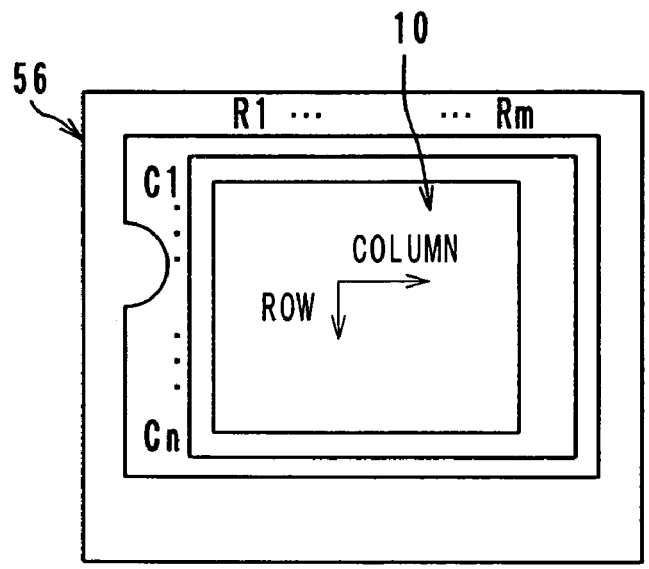
FIG. 19 is an illustration showing the state of the liquid crystal display before a format process.

Such memory cards 56 in a non-display state are distributed to users (see FIG. 19). In the control procedure described below, after a user fits the memory card 56 in the digital camera 100, a thumbnail picture on the liquid crystal display 10 is renewed every time a photograph is taken.

Figure 21:
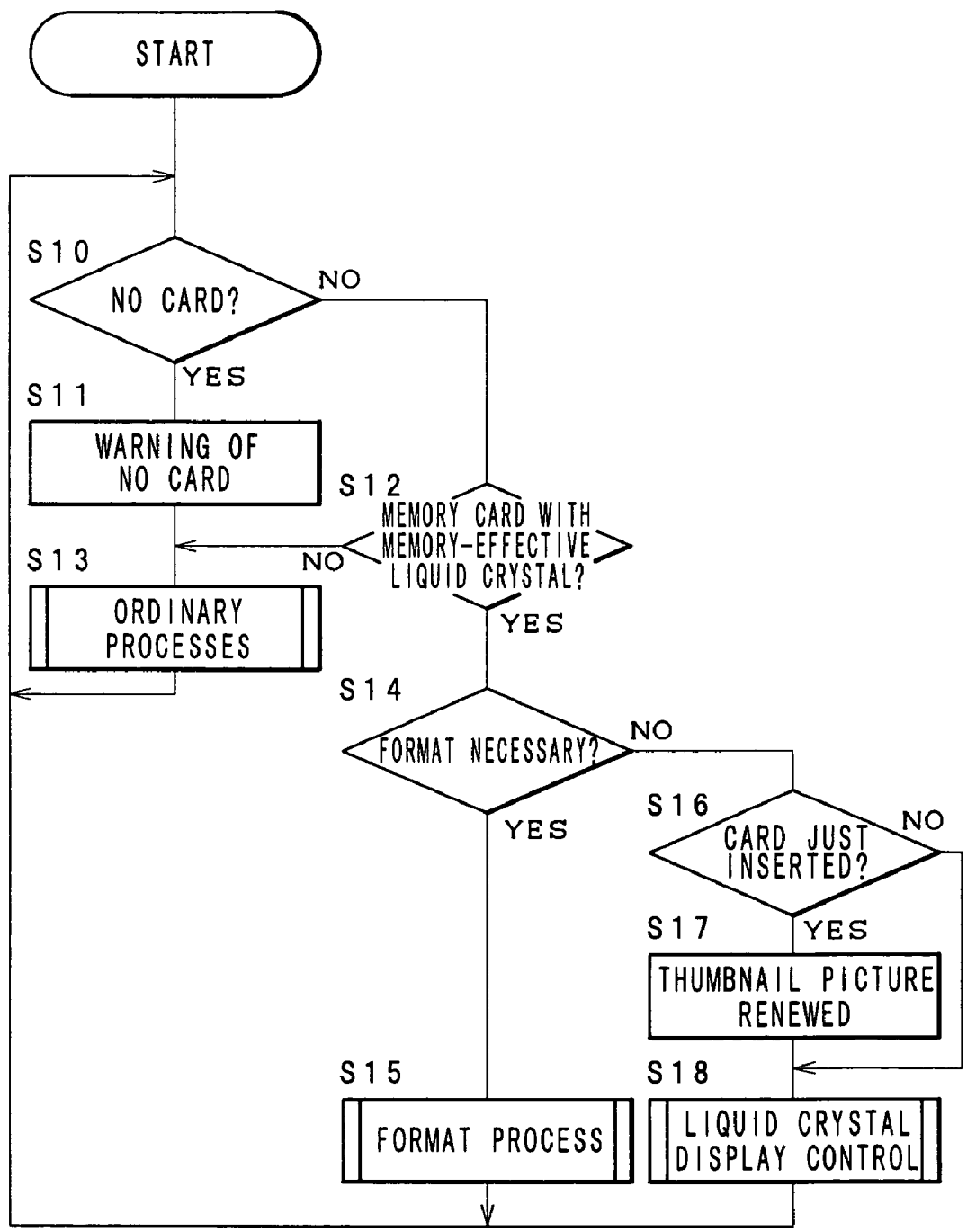
FIG. 21 is a flowchart showing a control procedure right after power-on of the digital camera.

FIG. 21 is a flowchart of the control procedure. When the digital camera 100 is turned on, first at step S10, the presence or absence of a memory card in the camera 100 is judged. If there is no card, a warning is displayed at step S11. If there is a card, it is judged at step S12 whether or not the card is a memory card with memory-effective liquid crystal. This judgment is made from the attribute (data stored in a specified address) of the card. If there is no card in the camera 100 or if there is a conventional memory card in the camera 100 ("NO" at step S12), ordinary processes of a conventional digital camera are carried out at step S13. When a memory card with memory-effective liquid crystal is fitted in the digital camera, it is judged at step S14 whether or not a format for a digital camera is necessary.

If a format is necessary, a format process is performed at step S15. At step S15, a format process is started after the user's confirmation, and during the format process, the central control section 211 performs writing on the liquid crystal display 10 via the card I/F 212. After completion of the format process, a framework 80 for thumbnail images, the number of photographed frames 82 and the remaining capacity of the card 83 are displayed on the liquid crystal display 10. A thumbnail image of one frame is of a size of 80×60 pixels and a space for display of information must be set in the periphery. Accordingly, thumbnail images of 16 frames can be displayed. Further, depending on the image size of the digital camera and the capacity of the memory card, more than 16 photographs can be taken. In this case, thumbnail images of all the frames are displayed by reducing the size of each image, or only thumbnail images of the latest used 16 frames are displayed.

If a format process is unnecessary ("NO" at step S14), a flag is checked at step S16 to judge whether or not the digital camera 100 is in a state right after the memory card with memory-effective liquid crystal has been fitted therein. This flag is 0 while there is no memory card in the digital camera 100. When a memory card is fitted in the digital camera 100, the flag is set to 1. Accordingly, by checking the state of this flag, the presence or absence of a memory card in the digital camera 100 can be judged.

Right after fitting of a memory card in the digital camera 100, there is a possibility that the picture on the liquid crystal display may be out of order, and therefore, although photography has not been performed yet, the picture on the liquid crystal display is renewed at step S17. More specifically, thumbnail images are read out from the memory card and displayed. Thereafter, the liquid crystal display is controlled at step S18.

Figure 22:
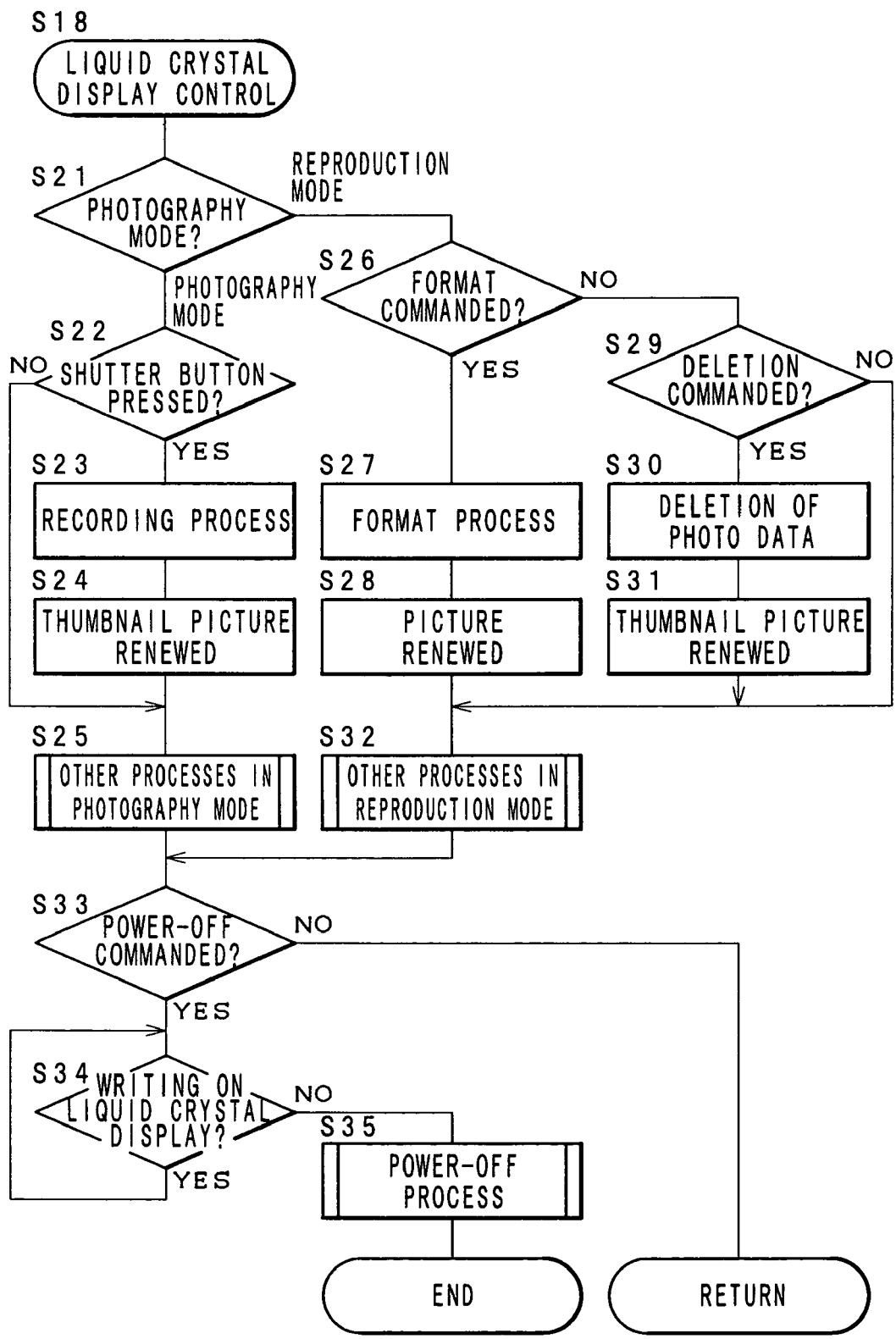
FIG. 22 is a flowchart showing a control procedure of the liquid crystal display.
Figure 23:
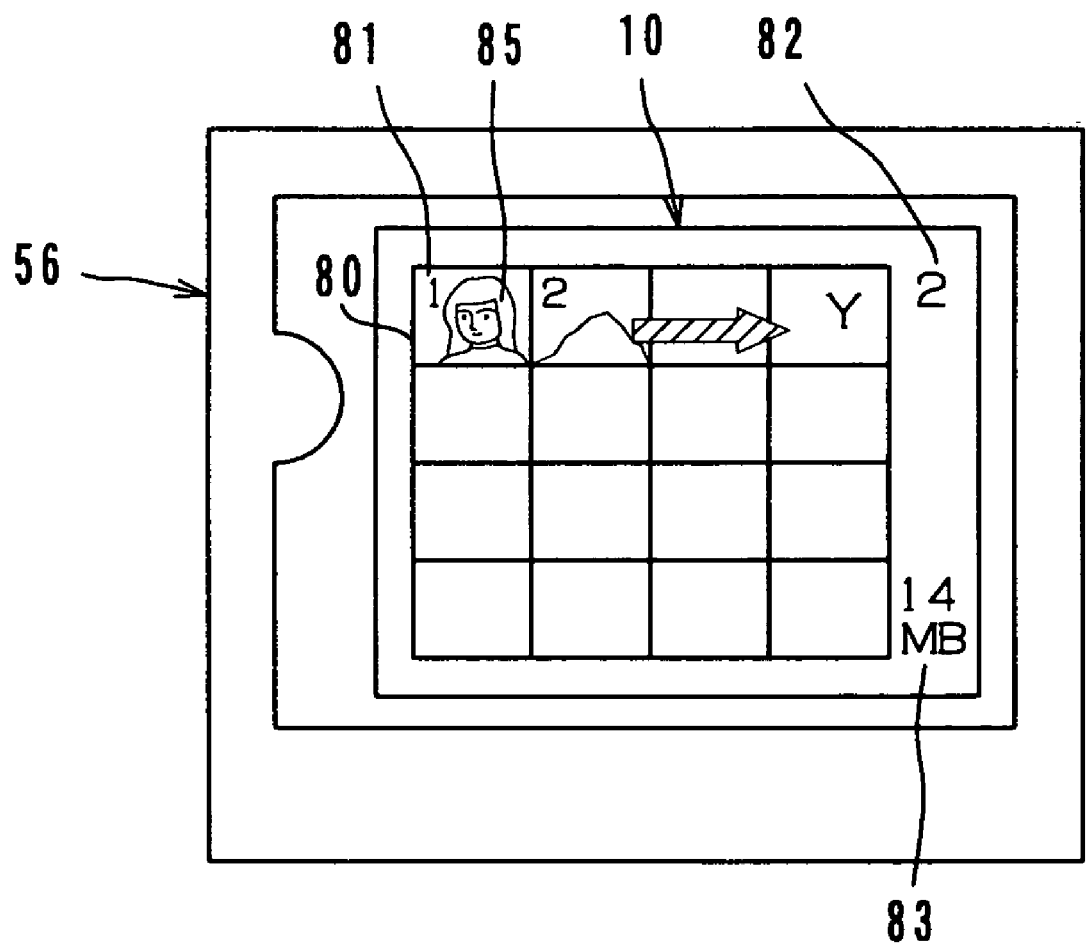
FIG. 23 is an illustration of a thumbnail picture on the liquid crystal display.

Referring to FIG. 22, a liquid crystal display control procedure performed at step S18 is described. First at step S21, the mode of the camera is judged. If the photography mode is set, processes at steps S22 through S24 are performed. It is judged at step S22 whether or not the shutter button 109 has been fully pressed, that is, has come to the state S2. When the shutter button 109 has been fully pressed, at step S23, image data processing of a photographed image is performed, and the data are recorded into a flash memory of the memory card 56. At step S24, the thumbnail picture on the liquid crystal display 10 is renewed. More specifically, as FIG. 23 shows, thumbnail images 85 and frame numbers 81 of photographed images are displayed in the respective display sections for the frames. Simultaneously, the number of used frames 82 and the remaining capacity 83 of the memory card 56 are renewed. Then, other processes in the photography mode are carried out at step S25, and the program goes to step S33.

In the liquid crystal display 10, as described above, the data electrode driving circuit 22 drives the data electrodes which extend in the column direction, and therefore, data are written row by row. Accordingly, addition of a thumbnail image is made in the column direction as shown by arrow "Y" in FIG. 23. If a thumbnail image is added in the row direction (perpendicular to the direction of arrow "Y"), for example, when a thumbnail image of the second frame is to be added, the thumbnail image of the first frame must be written again, which requires more time for renewal.

If the data electrode driving circuit 22 of the liquid crystal display 10 drives the data electrodes which extend in the row direction, addition of a thumbnail image shall be made in the row direction. In short, addition of a thumbnail image shall be made in a direction parallel to the extending direction of the data electrodes driven by the data electrode driving circuit 22.

Figure 24:
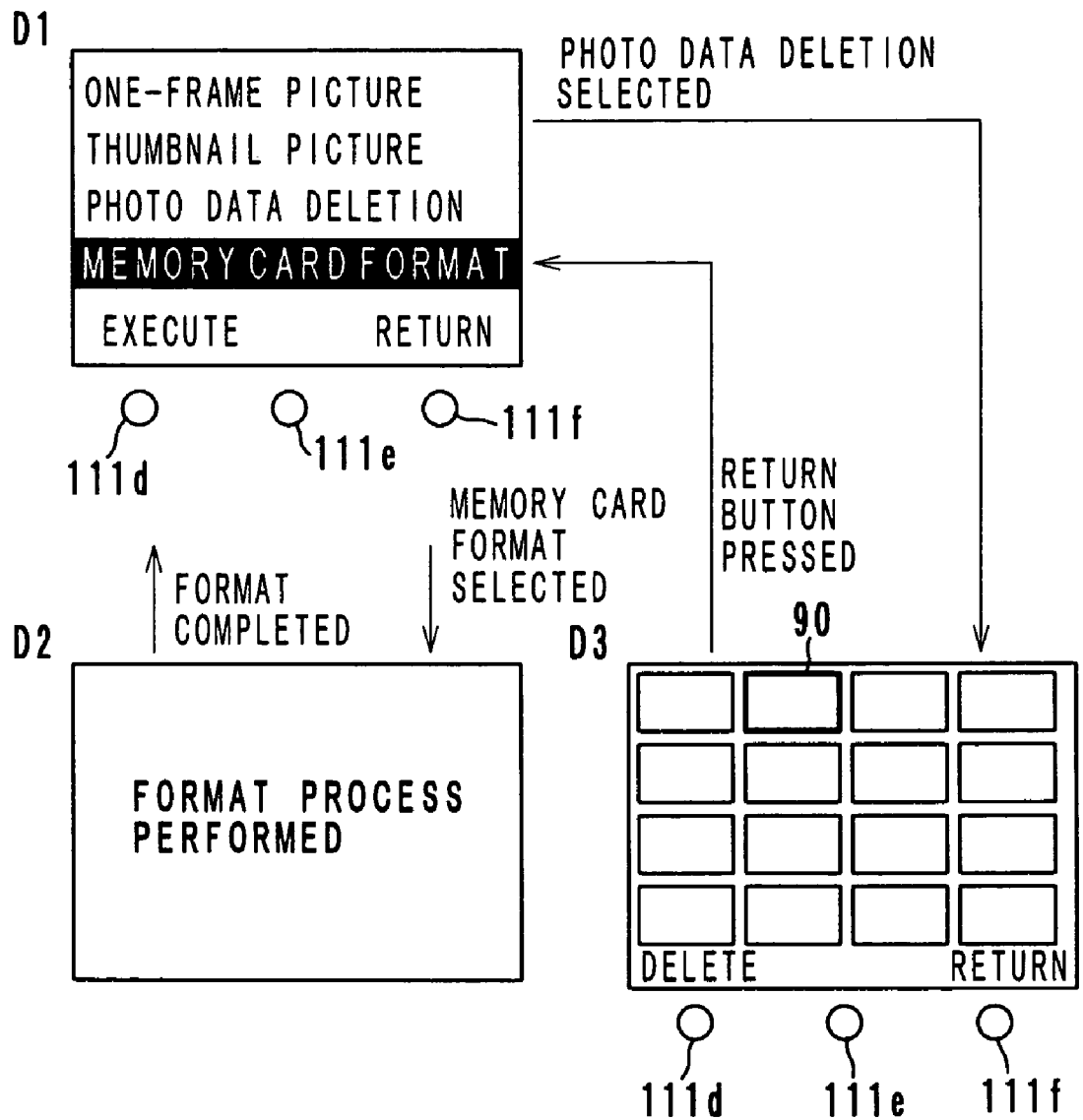
FIG. 24 is an illustration showing exemplary pictures to be displayed on a LCD section of the digital camera.

In the reproduction mode, in the LCD section 110 of the camera 100, simultaneous display of all the photographed images, format of the memory card, and deletion of a specified image are possible. FIG. 24 shows main pictures changeably displayed on the LCD section 110 in the reproduction mode. Right after a mode change from the photography mode to the reproduction mode, the photographed image of the highest frame number is displayed, and then, by operating the operation key 111, the picture is changed to a menu selection picture D1.

On the picture D1, four modes shown in FIG. 24 are available, and these modes can be selected cyclicly by pressing the buttons 123 and 124 of the four-throw switch. When an execute key 111d is pressed with "memory card format" selected in the picture D1, a picture D2, which shows that a format process is being performed, appears. On completion of the format of the memory card, the display returns to the picture D1.

When the execution key 111d is pressed with "photo data deletion" selected in the picture D1, a picture D3, which shows all the photographed images, appears. In this state, by operating the four-throw key 121 through 124, a specified image can be selected, and the selected image is enclosed by a frame 90. Then, by pressing the key 111d, the data of the selected image are deleted. When a return key 111f is pressed, the display returns to the picture D1.

Referring to FIG. 22 again, this operation is described. It is judged at step S26 whether or not format of the memory card has been commanded. When the format is designated and commanded, a format process of the memory card is performed at step S27. Next, the picture on the liquid crystal display 10 is renewed at step S28, and more specifically, all the thumbnail images are erased.

When deletion of a photographed image is commanded ("YES" at step S29), data of the designated frame are deleted at step S30, and the thumbnail picture on the display 10 is renewed at step S31. More specifically, if data of the "n"th frame are deleted, image data of the "n+1"th frame is restored as image data of the "n"th frame, and the thumbnail image of this frame is displayed in the section for the "n"th frame. These processes are performed to all the image data of the "n+1"th and subsequent frames. At step S32, other processes in the reproduction mode are carried out, and the program goes to step S33.

At steps S33 through S35, electric power is shut off. It is judged at step S33 whether or not a command of power off has been issued by operation of the power switch 112. If power off has not been commanded, the program returns to the main routine. If power off has been commanded, completion of renewal of the thumbnail picture is waited at step S34, and a power-off process is performed at step S35. Thereby, there is no trouble that power may be turned off in the middle of renewal of the thumbnail picture.

Display Section Commonly Used Type

Figure 25:
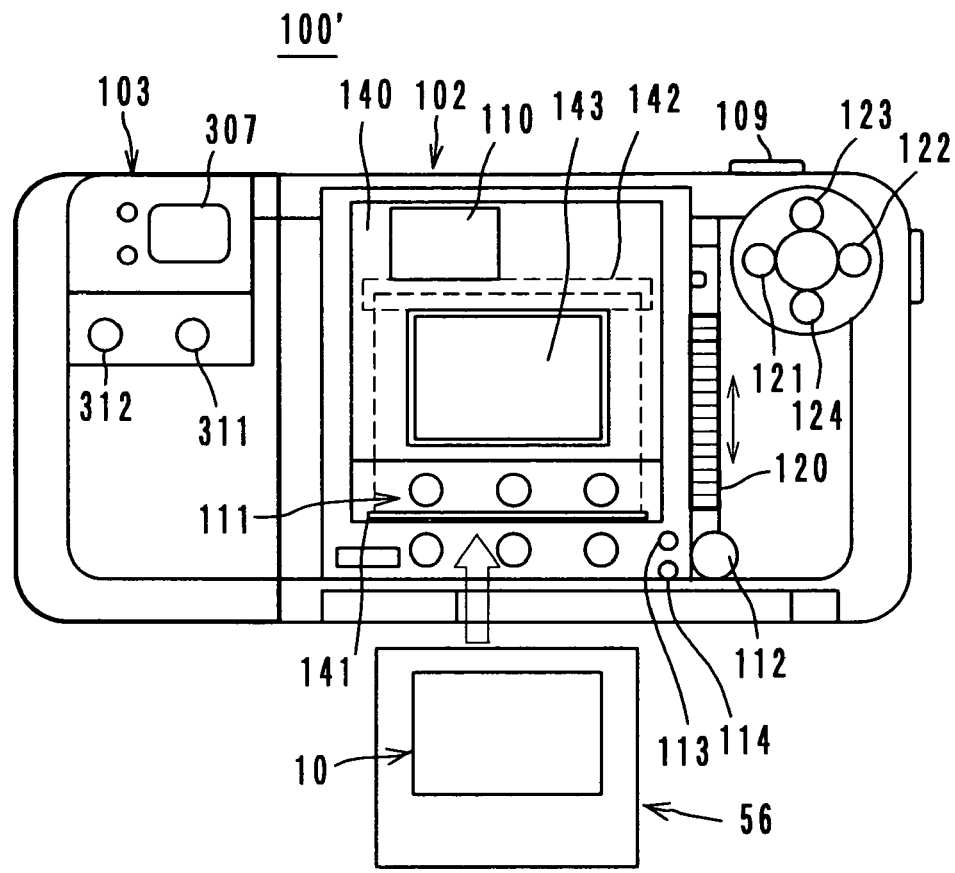
FIG. 25 is a rear view of a second exemplary digital camera according to the present invention.
Figure 26:
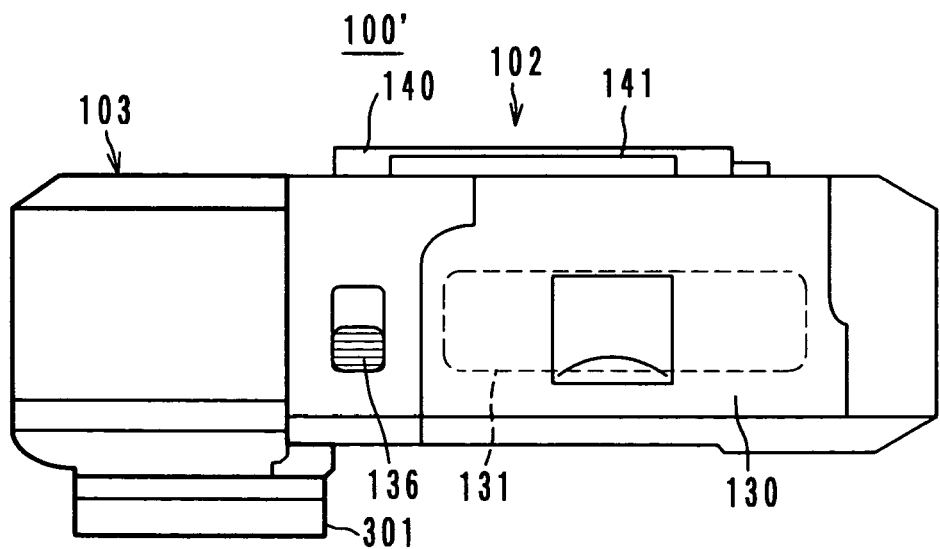
FIG. 26 is a bottom view of the digital camera shown by FIG. 25.

Since the memory card according to the present invention has a liquid crystal display section, it is possible to display not only the content of the memory card but also information about a digital camera on the display section. In the following, a digital camera 100' which commonly uses a display section of a memory card is described. FIGS. 14 and 16 are also a front view and a side view of this camera 100'. FIGS. 25 and 26 are a rear view and a bottom view of the digital camera 100', respectively. The same members are denoted by the same reference symbols as shown in FIGS. 14 through 17, and repetition of descriptions of these members is omitted. Although a case of using the memory card shown by FIG. 9 will be described, needless to say, memory cards of other types can be used.

Referring to FIGS. 25 and 26, on a display support 140 provided on the rear side of the camera body 102, a card slot 141 and a connector 142 for the memory card 56 are provided. The memory card 56 is inserted in the camera 100' through the lower side of the display support 140. On the rear side of the display support 140, in a place facing the liquid crystal display 10 of the memory card 56, a window 143 is formed. Thereby, when the memory card 56 is inserted, the screen of the liquid crystal display 10 can be seen, and in this state, the liquid crystal display 10 can be also used as a display section of the camera 100'.

Further, the digital camera 100' has, in the camera body 102, an LCD section 110 using conventional TFT liquid crystal which emits light from a back light. Because the renewal speed of the liquid crystal display 10 is relatively low, the LCD section 110 is exclusively used to display a motion picture. By pressing the LCD button 311, the LCD section 110 can be turned on and off. If low-speed renewal of a motion picture is permissible, the LCD section 110 is not always necessary. If the LCD section 110 is not provided, the LCD button 311 is unnecessary.

An operation sequence in a case of using the liquid crystal display 10 of the memory card 56 as a display section of a camera is described.

(1) Case of not Providing LCD Section 110

In this case, from the control circuit shown by FIG. 18, the VRAM 210, the LCD section 110 and the back light 160 are omitted. The omission of the back light 160 especially reduces the consumption of electric power, which prolongs the lives of the batteries.

Figure 20:
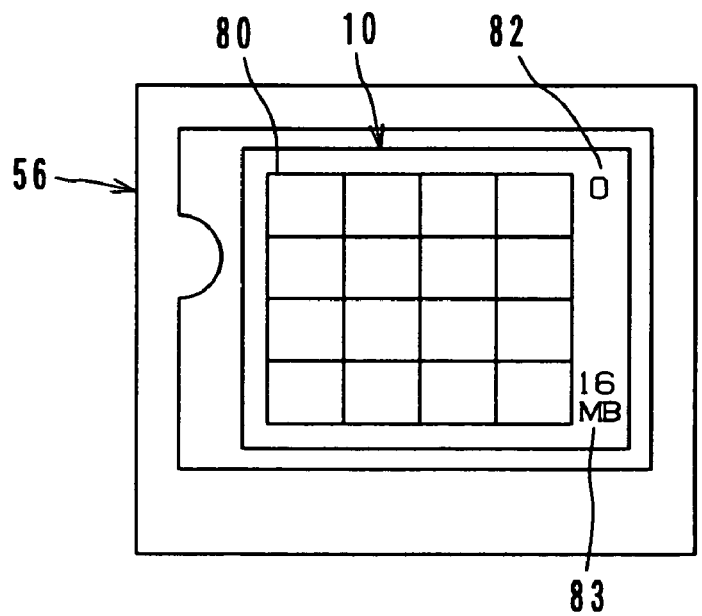
FIG. 20 is an illustration showing an exemplary format of the liquid crystal display.
Figure 27:
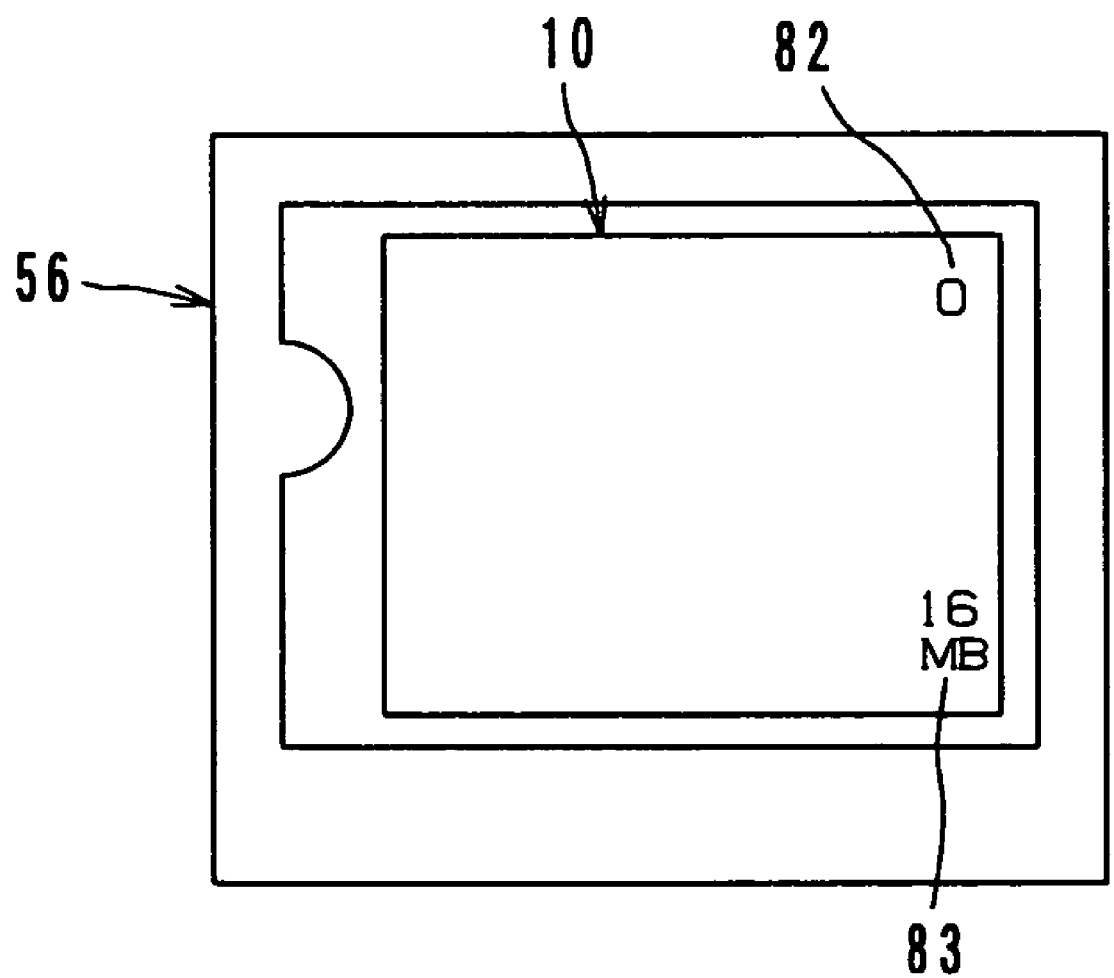
FIG. 27 is an illustration showing another exemplary format of the liquid crystal display.

Processes after power-on are performed in a similar way to the flowchart shown by FIG. 21. However, since a display section is not provided, the warning display of indicating no card at step S11 is made by flickering of the LED 114. After format, the display section of the card is in a state shown by FIG. 27, where the framework 80 for thumbnail images (see FIG. 20) are not displayed. In this display section commonly used type, there are various kinds of information to be displayed on the liquid crystal display 10 as well as thumbnail images, and it is not desirable to display the thumbnail framework 80 after every format.

Figure 28:
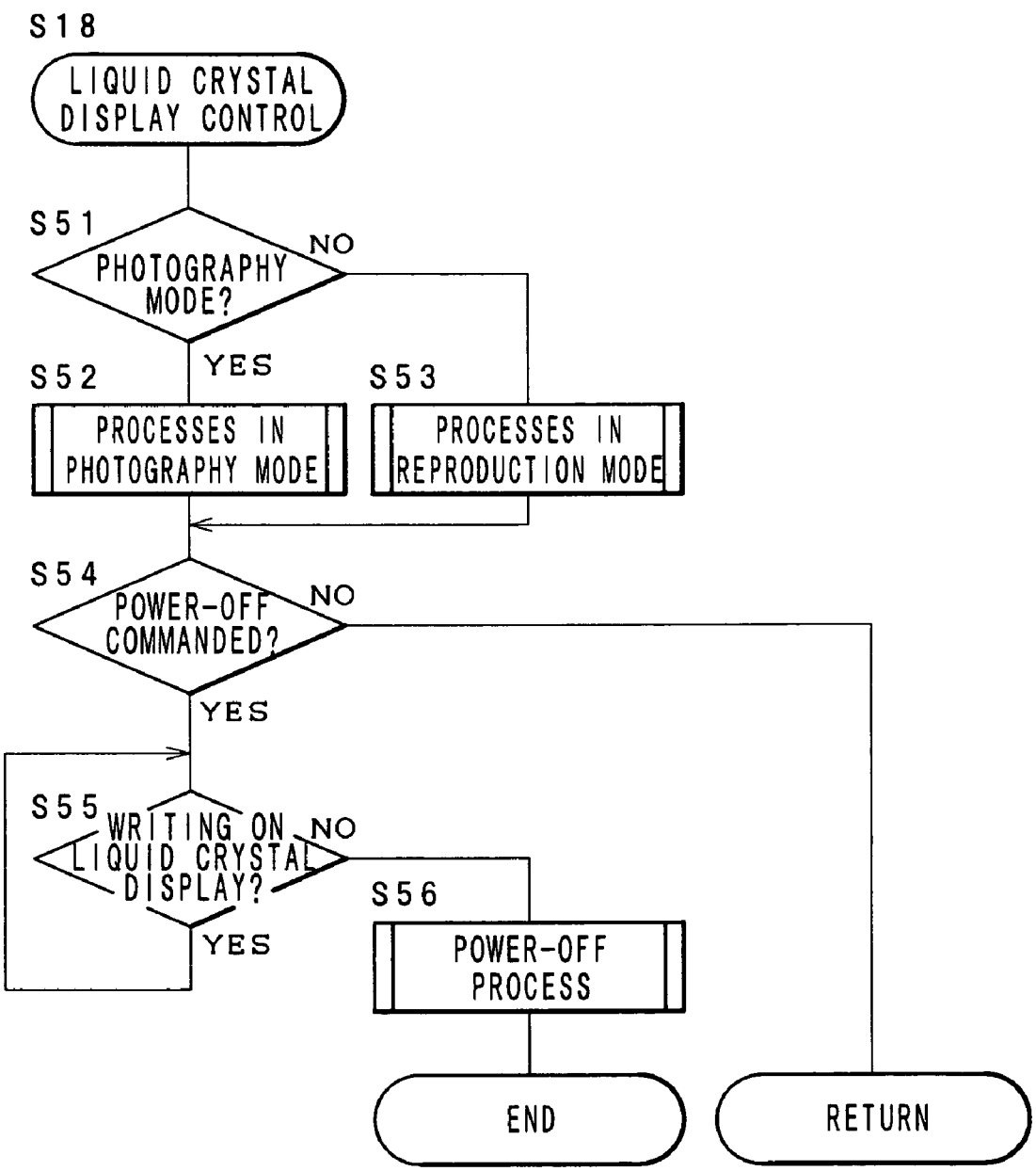
FIG. 28 is a flowchart showing a control procedure of the liquid crystal display in the second exemplary digital camera.
Figure 29:
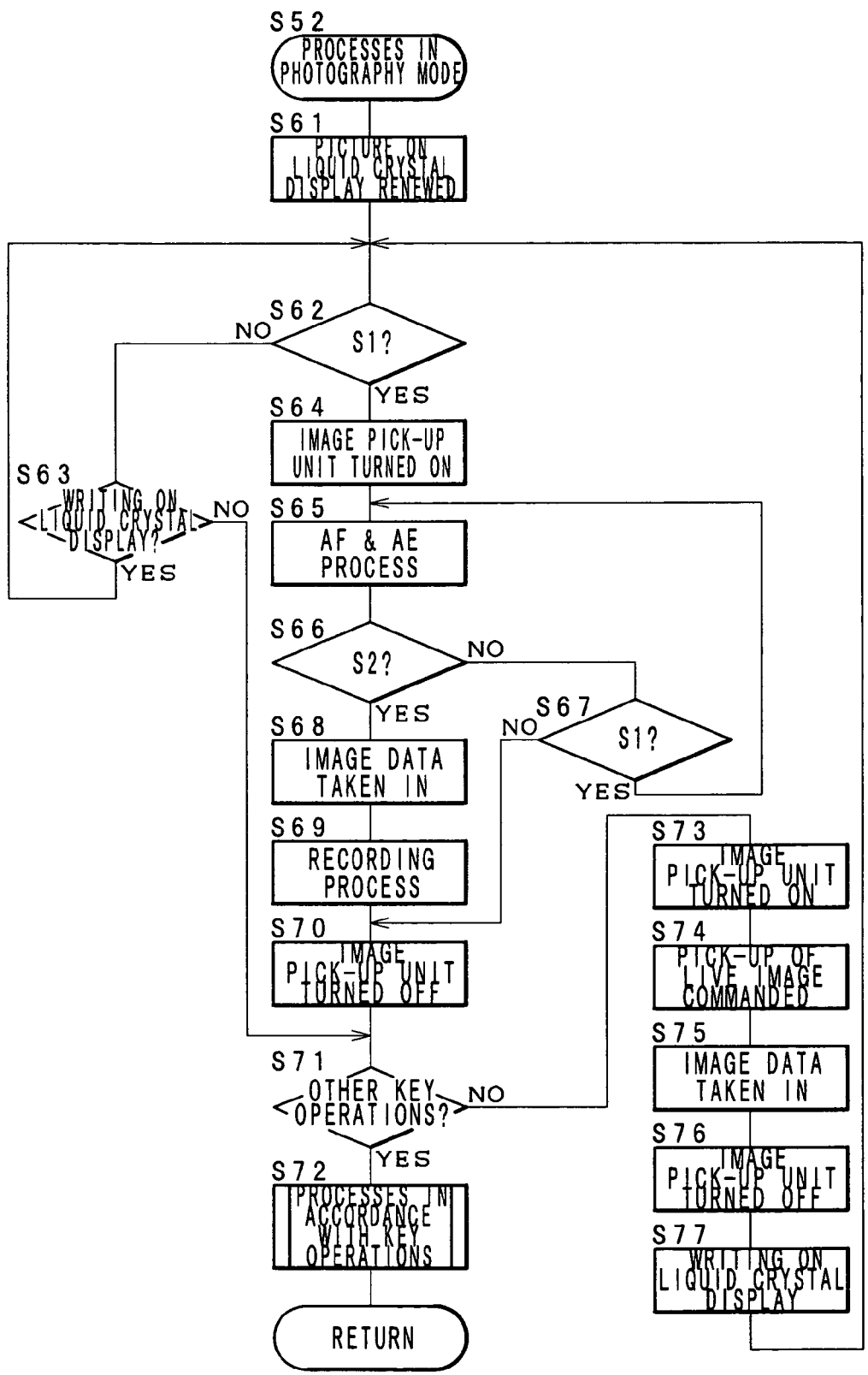
FIG. 29 is a flowchart showing a control procedure of the second exemplary digital camera in a photography mode.

The control of the liquid crystal display 10 at step S18 is carried out following the flowcharts shown by FIGS. 28 and 29. First at step S51, the state of the mode switch 120 is judged. In the photography mode, necessary processes are performed at step S52, and in the reproduction mode, necessary processes are performed at step S53. Processes to shut off the power are performed at steps S54 through S56 in the same way as steps S33 through S35.

Figure 30:
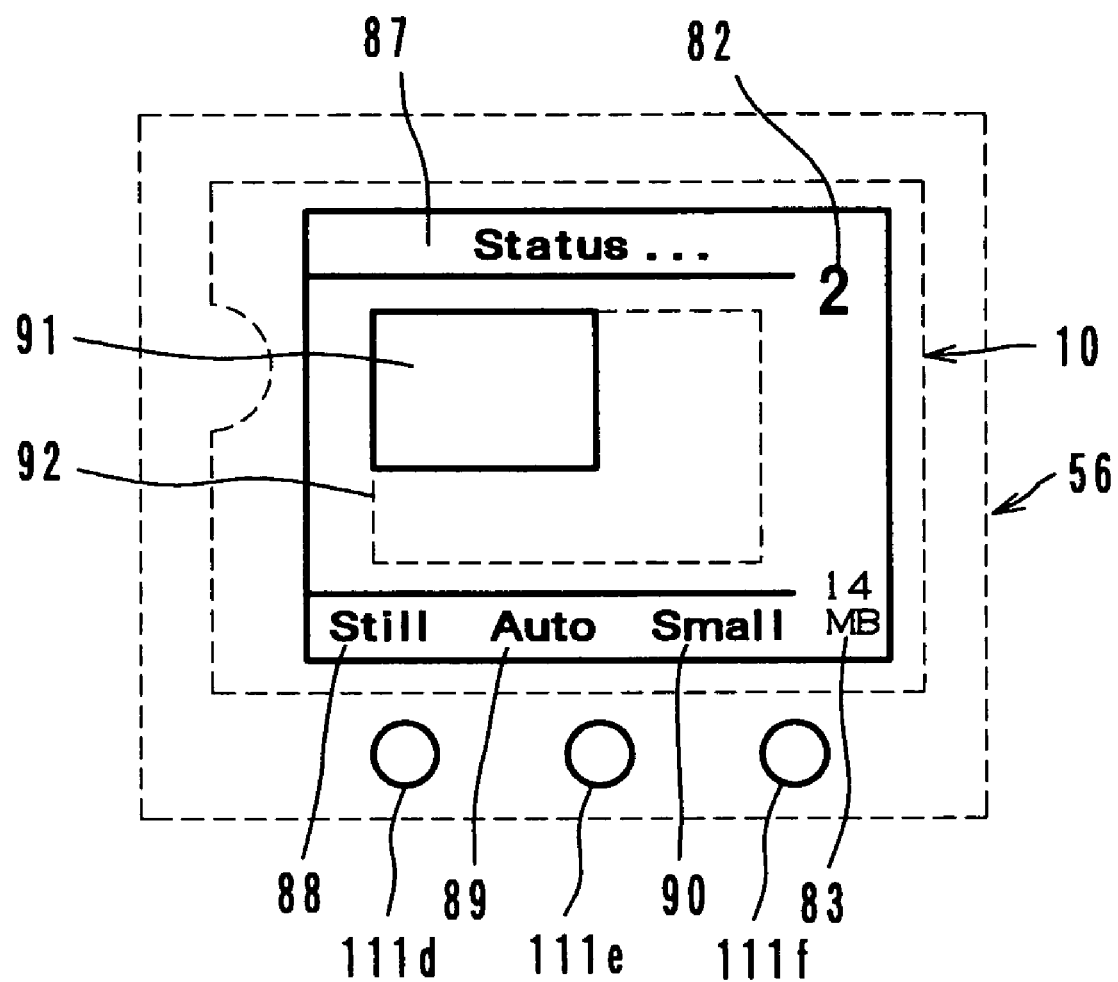
FIG. 30 is an illustration of another exemplary picture on the liquid crystal display.

Next referring to FIG. 29, the processes in the photography mode performed at step S52 is described. First at step S61, a photography mode picture shown by FIG. 30 appears on the liquid crystal display 10. In FIG. 30, the portion enclosed by the dotted line shows the memory card 56 inserted in the camera body 102. The numeral 82 denotes the number of used frames, and the numeral 83 denotes the remaining capacity of the memory card 56. The numeral 87 denotes a status line where various warnings such as a lack of illuminance are displayed. The numerals 88, 89 and 90 denote labels which show the states of the camera 100' with respect to the items selected by keys which are right under the labels. By pressing a key 111d right under the label 88, any of still photography, continuous shooting and interval shooting can be selected. By pressing a key 111e right under the label 89, the mode of the flash 105 can be changed. By pressing a key 111f right under the label 90, the size of a live view display area can be changed.

The live view display area is changeable between a small size 91 and a large size 92. When the display area is small, the number of pixels used for a display, and it is not necessary to rewrite a large area, which shortens the time for renewal of the image on the liquid crystal display is small 10. On the other hand, when the display area is large, although it takes a longer time for renewal, the details of the object can be recognized because the number of used pixels is large. In this way, by changing the size of the live view display area depending on the purpose, both the efficiency and the visibility can be satisfied.

Referring back to FIG. 29, it is judged at step S62 whether or not the shutter button 109 is in the half-pressed state S1. If the button 109 is not in the state S1, it is judged at step S63 whether or not the liquid crystal display 10 is in the middle of image writing. If not, it is judged at step S71 whether or not any other key is operated. If there is no operation of keys, the central control section 211 commands supply of electric power to the image pick-up unit 103 at step S73 and commands pick-up of a live view image at step S74. Thereafter, image data are stored in the image memory 209 at step S75, and on completion of the storage of image data, the power supply to the image pick-up unit 103 is shut off at step S76. Next, at step S77, in accordance with the image data stored in the image memory 209, writing of a live view image on the liquid crystal display 10 is started. Then, the program returns to step S62.

After completion of the writing, as long as operation of no keys other than the shutter button 109 is recognized ("NO" at step S71), pick-up of a next live view image is performed at step S74. Thus, the completion of renewal of the image on the liquid crystal display 10 is used as a trigger to command the image pick-up unit 103 to pick up a live view image. Thereby, during writing of a live view image on the liquid crystal display 10, the CCD 303 can be turned off, which promotes saving of electric power. Further, the trigger to command pick-up of a next live view image does not have to be the completion of image writing which is judged at step S63 and may be a time a little earlier than the completion of image writing.

In this control procedure, when "NO" at step S63, the program goes to step S71. This means that during image writing on the liquid crystal display 10, operation of any key is not inputted. With this arrangement, there is no possibility that whenever operation of any key is received in the middle of image writing, the image writing is performed again from the beginning, that is, it never takes so long a time for renewal of the image on the liquid crystal display 10, and the efficiency of this camera 100' is highly improved.

When the shutter button 109 is in the half-pressed state S1 ("YES" at step S62), the image pick-up unit 103 is turned on at step S64, and an AF process and an AE process are performed at step S65. Thereafter, when it is judged at step S66 that the shutter button 109 comes to the full-pressed state S2, data of an image photographed by the CCD 303 are taken in at step S68, and the image data are stored in the flash memory of the memory card 56 at step S69. Then, the image pick-up unit 103 is turned off at step S70, and the program goes to step S71.

On the other hand, if the shutter button 109 does not come to the state S2 ("NO" at step S66), it is judged at step S67 whether or not the shutter button 109 is in the state S1. If the shutter button 109 is in the state S1, the program returns to step S65. If the shutter button 109 is not in the state S1, the power supply to the image pick-up unit 103 is shut off at step S70, and the program goes to step S71.

Although operations of keys are not received during image writing on the liquid crystal display 10, only when the shutter button 109 is in the state S1, operations of keys are received. Therefore, the user never misses a shutter chance.

When an operation of any other key is recognized at step S71, a process in compliance of the operation of the key is performed at step S72. For example, when a mode change to the reproduction mode is commanded, a reproduction mode process, which will be described below, is performed.

Figure 31:
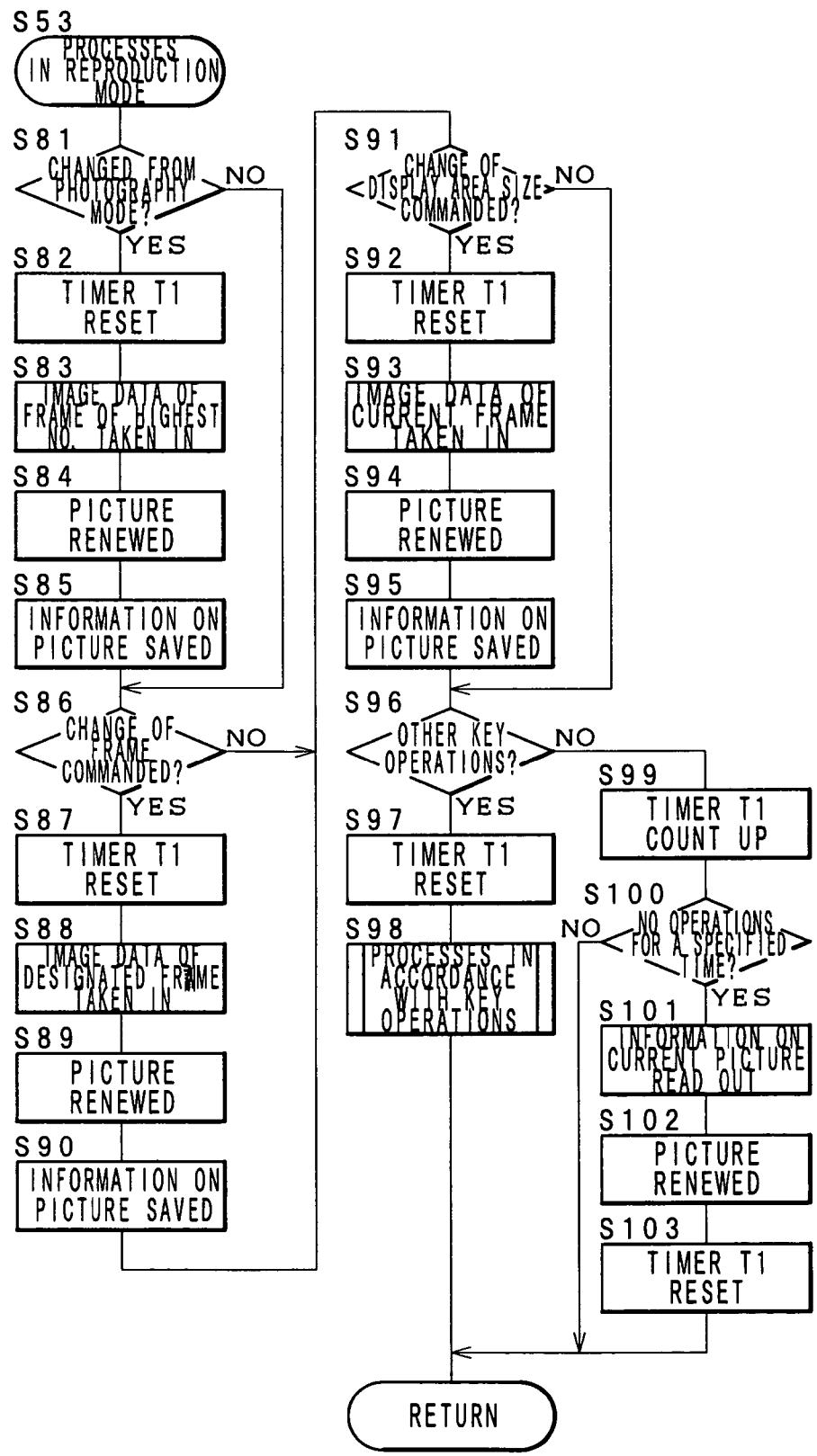
FIG. 31 is a flowchart showing a control procedure of the second exemplary digital camera in a reproduction mode.

Now referring to FIG. 31, a control procedure in the reproduction mode is described. First at step S81, it is judged whether or not a mode change from the photography mode has been made. If the change has been made, a timer T1, which is used to judge whether the camera 100' has not been operated for a specified time, is reset at step S82. Then, at steps S83 through S85, the picture on the liquid crystal display 10 is changed to one for the reproduction mode.

Figure 32:
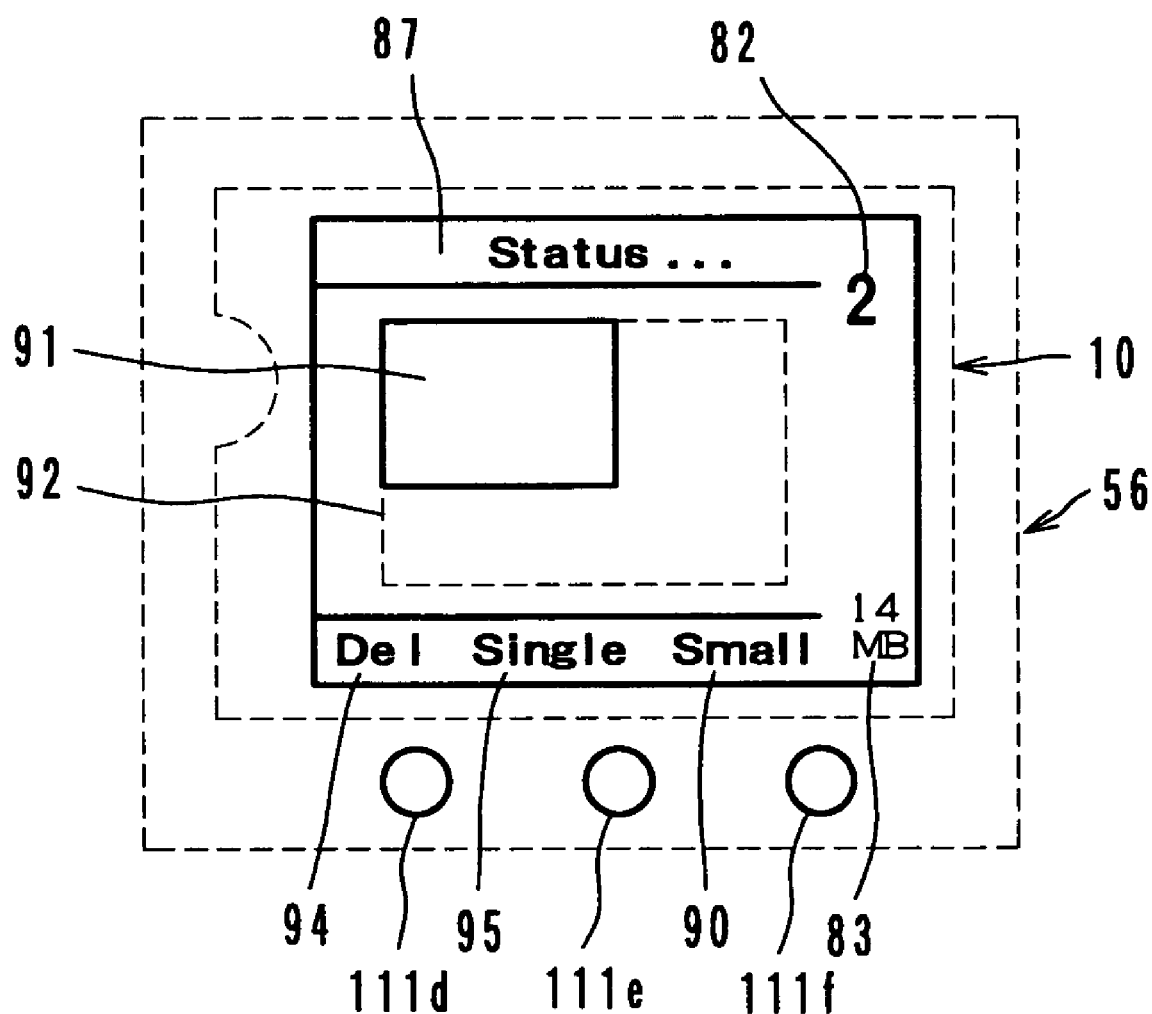
FIG. 32 is an illustration showing another exemplary picture on the liquid crystal display.

Specifically, at step S83, image data of the highest frame number is read out of the flash memory of the memory card 56, and the image is displayed at step S84. Here, the picture shown by FIG. 32 is displayed. In FIG. 32, the same reference symbols as used in FIG. 30 show the same items. What are newly displayed are a label 94 for deletion and a label 95 for one-frame display. The key 111d right under this label 94 functions as a delete key. The key 111e right under the label 95 functions as a one-frame display/thumbnail display switching key. In the portion denoted by the numeral 87, the status of the camera 100' is displayed; however, the file name of the displayed image, the date and time of photography, etc. may be also displayed in the portion 87 if necessary. The numerals 91 and 92 denote areas where a photographed image can be displayed. By pressing the key 111f right under the label 90, the size of the display area can be changed as in the photography mode.

Thus, because the content of the display for the photography mode and the content of the display for the reproduction mode overlap (the number of used frames 82, the remaining capacity 83, etc.), at the time of a mode change, the picture on the liquid crystal display 10 does not have to be wholly changed, which saves time for renewal.

Referring back to FIG. 31, at step S85, the information of the image displayed on the liquid crystal display 10 is temporarily saved in the work memory of the central control section 211. The reason will be described later. The format for the temporary saving is as follows:

codes to be displayed on the status line: file name, date and time of photography, etc.

frame number: frame number currently displayed states of the keys: the content of 94, 95 and 90

Next, it is judged at step S86 whether or not a change of displayed frame has been commanded, and the timer T1 is reset at step S87. The frame change is made in the following way: when the button 121 of the four-throw switch is pressed, the liquid crystal display 10 takes in image data of the frame of one lower number and displays the image; and when the button 122 is pressed, the liquid crystal display 10 takes in image data of the frame of one higher number and displays the image. In short, at steps S88 and S89, image data are taken into the liquid crystal display 10, and the picture on the display 10 is renewed. At step S90, the information of the displayed image is saved in the work memory.

Next, it is judged at step S91 whether or not a change of the display area size has been commanded. When the change is commanded, the timer T1 is reset at step S92. Then, image data of the frame are taken into the liquid crystal display 10 again at step S93, and at step S94, the image is displayed in the area of the designated size. Subsequently, at step S95, the information of the displayed image is saved in the work memory.

Further, if an operation of any other key is recognized at step S96, the timer T1 is reset at step S97, and a process in compliance with the operation of the key is performed. If necessary, the picture on the liquid crystal display 10 is renewed, and the information is saved. Then, the program returns to the main routine.

On the other hand, if "NO" at step S96, that is, when no keys are operated, the timer T1 counts up at step S99. After it is judged at step S100 from the count-up of the timer T1 that the camera 100' has not been operated for a specified time (for example, five minutes), the information of the currently displayed image is read out of the work memory at step S101. Then, the image indicated by the information is displayed again on the liquid crystal display 10 at step S102, and the timer T1 is reset at step S103.

The picture on the liquid crystal display 10 is renewed at step S102 because of the following reason. Cholesteric liquid crystal used in this embodiment has an advantage of not consuming electric power while maintaining a display thereon. Accordingly, while no operation is made to the liquid crystal display 10, the same picture is continuously displayed. If any external stress is applied to the display 10 during the time, the state of the liquid crystal may partly change and may cause deformation of the displayed picture. In order to avoid this trouble, at regular time intervals, for example, every five minutes, the picture on the display 10 is renewed.

Operations to be recognized at steps S96 and S100 includes a change from the reproduction mode to the photography mode. The mode change is performed at step S98, and in this time, the work memory is cleared.

(2) Case of Providing Display Section 110

Figure 33:
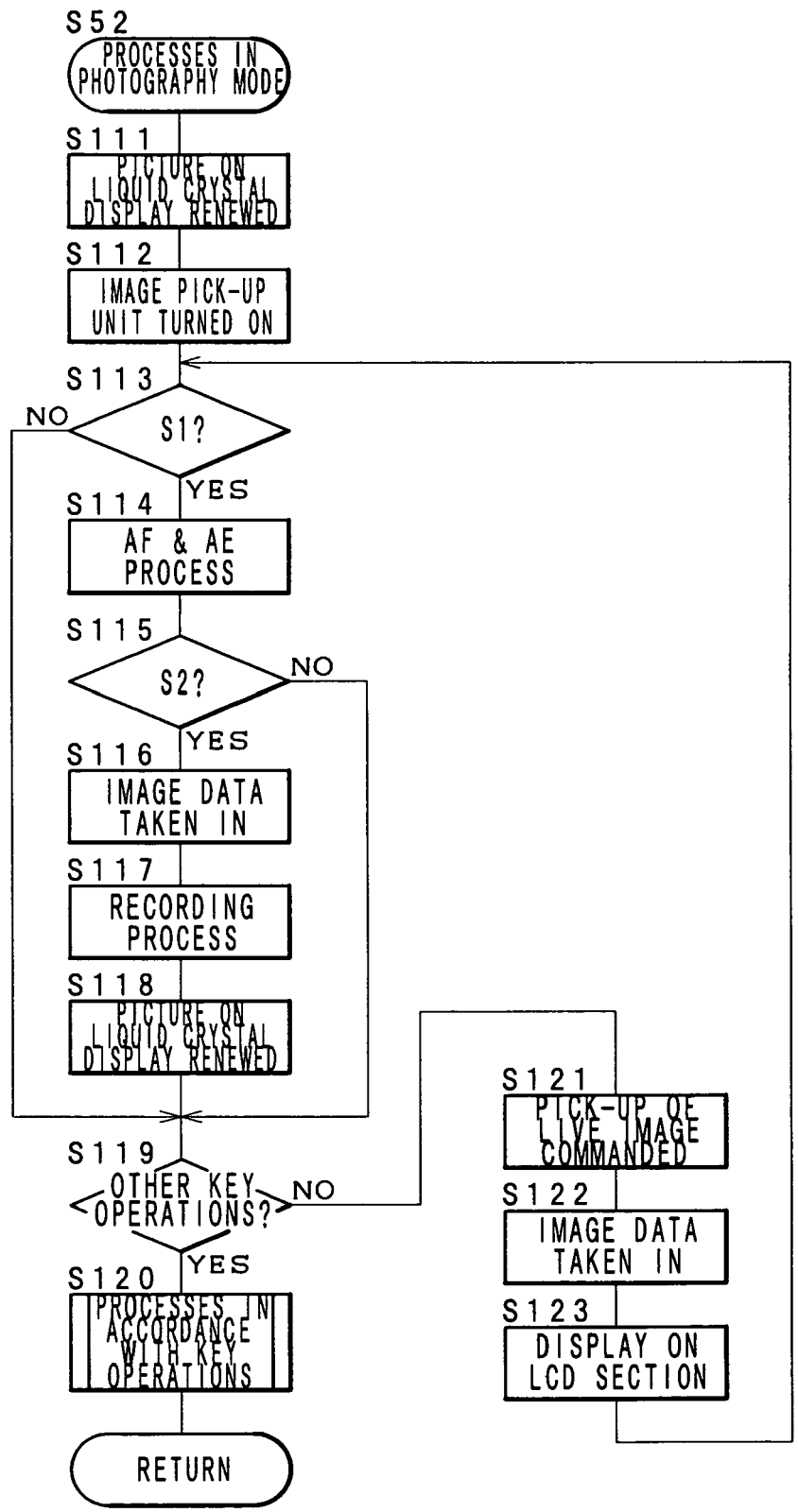
FIG. 33 is a flowchart showing another control procedure of the second exemplary digital camera in the photography mode.

In this case, in the photography mode, a live view image is displayed on the display section 110 which employs conventional TFT liquid crystal and a back light. In the reproduction mode, control is carried out following the procedure shown by FIG. 31. The control procedure in the photography mode is shown by FIG. 33.

Figure 34:
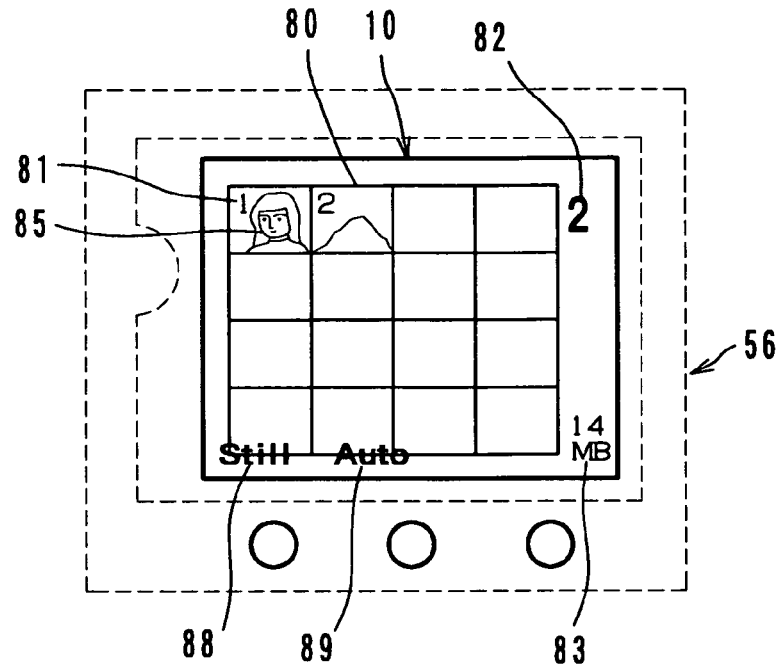
FIG. 34 is an illustration showing another exemplary picture on the liquid crystal display.

When a mode change from the reproduction mode to the photography mode is made, first at step S111, the picture on the liquid crystal display 10 is renewed, and a thumbnail picture is displayed thereon as shown by FIG. 34. Like the thumbnail picture shown by FIG. 23, every time a photograph is taken, a thumbnail image of the photographed image is added to this thumbnail picture. In FIG. 34, the parts with the same functions as those in FIGS. 23 and 30 are denoted by the same reference symbols, and description of these parts are omitted.

Since in the photography mode, a live view image is displayed on the display section 110 which is TFT liquid crystal with a back light, the image pick-up unit 103 is turned on at step S112, and live view images are taken in and displayed at regular time intervals. The image pick-up is described in more detail. It is judged at step S113 whether or not the shutter button 109 is in the half-pressed state S1. If the shutter button 109 is not in the state S1 and if operation of any other key (for example, a mode change to the reproduction mode) is recognized at step S119, a process in compliance with the operation of the key is performed at step S120. Then, the program returns to the main routine.

If no other keys are operated ("NO" at step S119), a command for pick-up of a live view image is issued at step S121. Data of the live view image are taken into the image memory 209 at step S122, and the image is displayed on the LCD section 110 at step S123. Then, the program returns to step S113.

When "YES" at step S113, that is, when the shutter button 109 is in the state S1, an AF process and an AE process are performed at step S114. Thereafter, when the shutter button 109 is judged to come to the full-pressed state S2 at step S115, data of the photographed image are taken in and processed at step S116, and the image data are stored in the flash memory of the memory card 56. Next, a thumbnail image of the photographed image is displayed on the liquid crystal display 10 at step S118.

Error Management

In using a memory card with memory-effective liquid crystal, as in using a conventional memory card, there is a possibility that recording and reading of data to and from the flash memory may become impossible by any reason. The following table shows probable errors and the causes.

Because the memory card according to this embodiment has a liquid crystal display with a memory effect, it is possible to display an error code on the display to inform the user of the kind of the error. Further, it is possible to display the cause and the measures as well as the error code.

TABLE 1

| Error Code | Kind of Error | Cause |
| --- | --- | --- |
| 1 | error of data recording to memory card 1 | damage on flash memory |
| 2 | Error of data recording to memory card 2 | over capacity |

TABLE 1-continued

| Error Code | Kind of Error | Cause |
| --- | --- | --- |
| 3 | error of data reading from memory card 1 | damage on flash memory |
| 4 | error of data reading from memory card 2 | theoretical disorder made in data recording |
| 5 | Non-operational | central control section beyond control, removal of memory card during an access |

Figure 35:
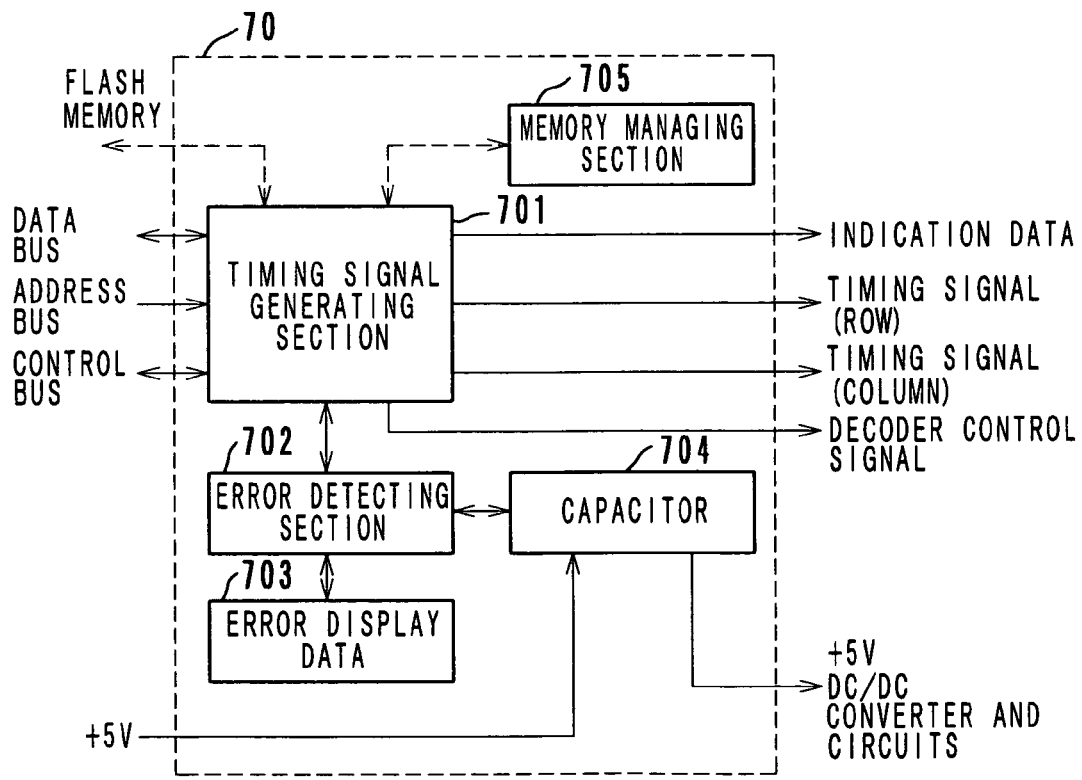
FIG. 35 is a block diagram showing the structure of a timing controller.

In order to manage these errors, as FIG. 35 shows, the timing controller 70 of the memory card according to this embodiment comprises a timing signal generating section 701, an error detecting section 702, and error display data 703, a capacitor 704 and a memory managing section 705.

Error of Data Recording to Memory Card 1

The timing signal generating section 701 performs display on the liquid crystal display 10 and data recording to the flash memory controlled by the central control section 211. When data are recorded in the flash memory, the central control section 211 checks whether or not specified data are correctly recorded to the flash memory. If the central control section 211 recognizes disorder during the check, the central control section 211 sends information of an occurrence of the recording error 1 to the error detecting section 702 via the timing signal generating section 701. In response, the error detecting section 702 selects a piece of display data corresponding to the error code 1 from the error display data 703 and sends the display data to the timing signal generating section 701. Then, the display data are displayed in an appropriate place on the liquid crystal display 10.

Error of Data Recording to Memory Card 2

The memory managing section 705 has a memory which is stored with data about the remaining capacity and the number of used frames. The central control section 211 records 1024 bits of data at a time when recording data to the flash memory. When the remaining capacity of the flash memory becomes smaller than 1024 bits, the central control section 211 sends information of an occurrence of the recording error 2 to the error detecting section 702 via the timing signal generating section 701. In response, the error detecting section selects a piece of display data corresponding to the error code 2 from the error display data 703 and sends the display data to the timing signal producing section 701. Then, the data are displayed in an appropriate place on the liquid crystal display 10.

Error of Data Reading from Memory Card 1

For data reading from the flash memory, the central control section 211 designates the address in the flash memory from which data are to be read out, and data are read out in synchronization with a reading timing signal outputted from the timing signal generating section 701. At this time, if data reading from the designated address is impossible, the error detecting section 702 selects a piece of display data corresponding to the error code 3 from the error display data 703 and sends the display data to the timing signal generating section 701. Then, the data are displayed in an appropriate place on the liquid crystal display 10.

Error of Data Reading from Memory Card 2

As mentioned above, for data reading from the flash memory, the central control section 211 designates the address in the flash memory from which data are to be read out, and data are read out in synchronization with the reading timing signal outputted from the timing signal generating section 701. In this time, if any disorder of data is recognized from the check sum, it can be regarded that any disorder occurred at the time of data recording. Accordingly, the error detecting section 702 selects a piece of display data corresponding the error code 4 from the error display data 703 and sends the display data to the timing generating section 701. Then, the data are displayed in an appropriate place on the liquid crystal display 10.

Non-Operational

The above-described error check processes are installed in the internal routine of the central control section 211. If the central control section 211 itself becomes beyond control and stops (the system may be so designed to shut the power off in such a case for protection of the system), the error check processes are not operative. The same thing happens when the memory card is taken out of the camera during an access.

In order to manage such a case, the memory card has a capacitor 704 with a capacity of approximately 300 μF. If the central control section 211 becomes beyond control, an error display is made by use of electricity stored in the capacitor 704.

The error detecting section 702 monitors signals exchanged between the central control section 211 and the timing signal producing section 701 via a control bus. If the timing clock stops or if a memory access signal stops suddenly whereas the timing clock works, it is judged that the central control section 211 becomes beyond control or that the memory card is taken out during an access. Accordingly, the error detecting section 702 selects a piece of display data corresponding to the error code 5 from the error display data and sends the display data to the timing signal generating section 701. Then, the data are displayed in an appropriate place on the liquid crystal display 10.

Thus, because the liquid crystal display 10 has a memory effect, an error display can be made even when the power is off. This brings an effect that the system can be protected while an error is managed.

Control Procedure Including Automatic Power-Off Process

The above-described digital cameras 100 and 100' are controlled not to accept a power-off command during image writing on the liquid crystal display 10 (see steps S32 through S35 in FIG. 22 and steps S54 through S56 in FIG. 28). Generally, in an electronic information device which uses a battery as its driving source, for energy saving, an automatic power-off system which automatically turns off the device when there have been no key operations for a specified time is adopted. In this case, if in the photography mode the automatic power-off system works to shut off the power during writing of a live view image on the liquid crystal display 10, an incomplete image will be continuously displayed, which is ugly.

Figure 36:
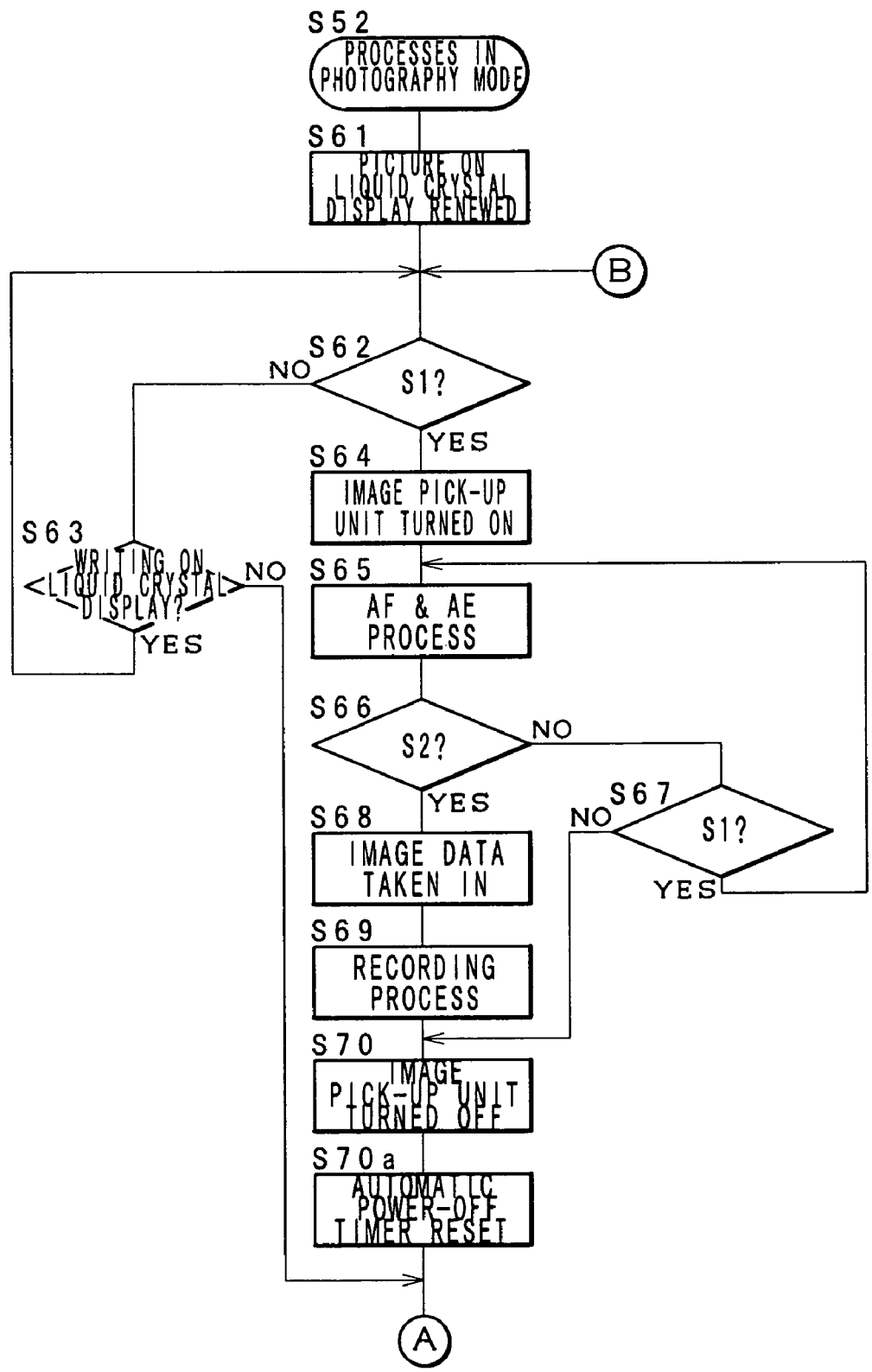
FIGS. 36 and 37 are flowcharts showing a control procedure in the photography mode including an automatic power-off process.
Figure 37:
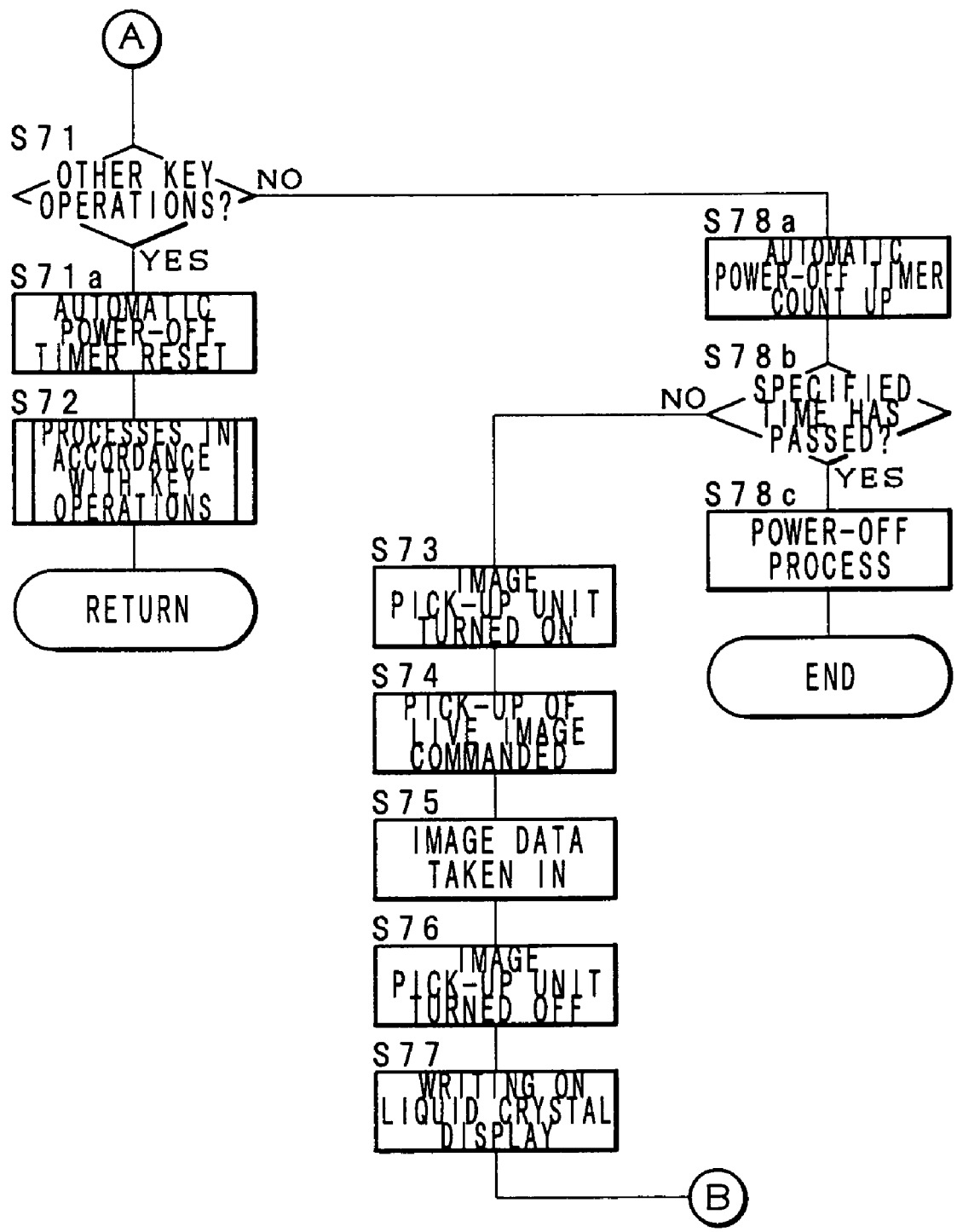

In including such an automatic power-off task in the control procedure for the photography mode shown by FIG. 29, as FIGS. 36 and 37 show, steps S70a, S71a, S78a, S78b and S78c shall be added. The processes at the other steps in FIGS. 36 and 37 are performed in the same ways as described with reference to FIG. 29.

The automatic power-off system is described. When a supply of electric power to the image-pick up unit 103 is shut off after image pick-up, an automatic power-off timer is reset at step S70a. Thereafter, if no key operations are recognized ("NO" at step S71), the timer counts up at step S78a, and it is judged from the count value of the timer at step S78b whether or not a specified time has passed. If the specified time has not passed, the processes at step S73 through S77 are performed, and when the specified time has passed (with no key operations), a power-off process is performed at step S78c. If any key operation is recognized at step S71, the automatic power-off timer is reset at step S71a.

By adopting an automatic power-off system as shown by FIGS. 36 and 37, it never occurs that a power-off process at step S78c is performed during image writing on the liquid crystal display 10 (step S63), and whenever a power-off process is automatically performed, image writing on the liquid crystal display 10 has been completed. Thus, there are no possibilities that an incomplete picture is continuously displayed.

OTHER EMBODIMENTS

In the embodiments above, memory cards are described as examples of storage media. It is, however, possible to provide a liquid crystal display on a surface of an electromagnetic disk or on a surface of a floppy disk. Also, a plurality of liquid crystal displays can be provided on one storage medium. The material with a memory effect to which the present invention is applicable is not limited to liquid crystal and, for example, may be a material which displays color by heat.

Although the present invention has been described in connection with the preferred embodiments, it is to be noted that various changes and modifications are possible to those who are skilled in the art. Such changes and modifications are to be understood as being within the scope of the present invention.

What is claimed is:

1. An electronic information device comprising:
    a display which uses a material having a memory effect, the display having a write mode for writing an image on the display based on image data and a display mode for displaying the image written in the write mode without electric power, and when the write mode is interrupted before completion of the writing of the image, an incomplete image including a part of the image remains to be displayed on the display in the display mode;
    an electric power source for supplying driving power to the display;
    a first input member to be operated by an operator to issue a turn off command to turn off the electric power source; and
    a controller which, in response to a command to turn off the electric power source which is issued while the display is performing writing of an image based on display data by consuming electric power supplied from the electric power source, turns off the electric power source after completion of the writing of the image which is being written on the display based on the image data when the command to turn off the electric power source is issued;

whereby the display displays a complete image based on the image data after the electric power source has been turned off.

2. An electronic information device according to claim 1, further comprising an image pick-up unit which picks up an image of an object by use of an image sensor and produces the image data.

3. An electronic information device according to claim 1, wherein information written on the display is a thumbnail picture such that a plurality of thumbnail images can be written side by side.

4. An electronic information device comprising:
a display which uses a material having a memory effect, the display having a write mode for writing an image on the display based on image data and a display mode for displaying the image written in the write mode without electric power, and when the write mode is interrupted before completion of the writing of the image, an incomplete image including a part of the image remains to be displayed on the display in the display mode;
an electric power source for supplying driving power to the display;
an input member to be manually operated by an operator to input a specified command;
a timer for counting elapsed time; and
a controller that resets a timer valued when the manual operation of the input member is conducted, and increments the timer value when the write mode has been completed;
wherein the controller performs the following processes:
an automatic power-off process which turns off the electric power source automatically when a timer value exceeds a predetermined value;
whereby the display displays a complete image based on the image data after the electric power source has been turned off.

5. An electronic information device according to claim 4, wherein the input member is a key switch.

6. An electronic information device according to claim 4, further comprising an image pick-up unit for picking up an image of an object by use of an image sensor and for producing the image data.

7. An electronic information device according to claim 4, wherein information written on the display is a thumbnail picture such that a plurality of thumbnail images can be written side by side.

8. An electronic information device comprising:
a display using a material having a memory effect, the display having a write mode for writing an image on the display based on display data and a display mode for displaying the image written in the write mode without electric power, and when the write mode is interrupted before completion of the writing of the image, an incomplete image including a part of the image remains to be displayed on the display in the display mode;
a first input member which is manually operated by an operator to input a specified command to instruct the electronic information device how to operate; and
a controller which, when the first input member is operated while writing of an image based on display data on the display is being performed, invalidates the command sent from the first input member and, when the first input member is operated after completion of the writing of an image based on display data, controls the electronic information device in accordance with the command sent from the first input member;
whereby when the first input member is operated during writing of an image based on the display data on the display, the display completely displays the image which was being written based on the display data when the first input member was operated after an electric power source supplying power to the display has been turned off.

9. An electronic information device according to claim 8, wherein the first input member is for inputting a command to shut off the supply of electric power to the display.

10. An electronic information device according to claim 8, further comprising:
a second input member with which an operator can input a command which is different from the command inputted with the first input member;
wherein, the controller controls the electronic information device in accordance with the command sent from the second input member regardless of whether or not writing on the display is being performed.

11. An electronic information device according to claim 10, wherein the second input member is a shutter button.

12. A method of controlling an electronic information device, said method comprising the steps of:
writing an image based on display data on a display which uses a material having a memory effect by supplying electric power to the display from an electric power source, the display having a write mode for writing an image on the display and a display mode for displaying the image written in the write mode without electric power, and when the write mode is interrupted before completion of the writing of the image, an incomplete image including a part of the image remains to be displayed on the display in the display mode;
commanding a power-off of the electric power source in response to an operating of a first input member by an operator; and
when a power-off of the electric power source is commanded while the display is performing writing of an image based on display data by consuming electric power supplied from the electric power source, executing the power-off command after completion of the writing of the image which is being written on the display based on the display data when the power off of the electric power source is commanded;
whereby when the power off of the electric power source is commanded while the display is performing writing of an image based on display data, the display displays a complete image based on the display data after the electric power source has been turned off.

13. A control method according to claim 12, further comprising the step of picking up an image of an object by use of an image sensor and producing the image data.

14. A control method according to claim 12, wherein information written on the display is a thumbnail picture such that a plurality of thumbnail images can be written side by side.

15. A method of controlling an electronic information device, said method comprising:
a write step of writing an image based on display data on a display which uses a material having a memory effect by supplying electric power to the display from an electric power source, the display having a write mode for writing an image on the display and a display mode for displaying the image written in the write mode without electric power, and when the write mode is interrupted before completion of the writing of the image, an incomplete image including a part of the image remains to be displayed on the display in the display mode;

an automatic power-off step of automatically turning off the electric power source when a timer value of a timer exceeds a predetermined value;

an increment step of the timer value which increments the timer value when the write mode has been completed; and a resetting step that resets the timer value when a manual operation of an input member is operated by an operator to input a specific command;

whereby the display displays a complete image based on the display data after the electric power source has been turned off.

16. A control method according to claim 15, wherein the input member is a key switch.

17. A control method according to claim 16, further comprising an image pick-up step of picking up an image of an object by use of an image sensor and producing the image data.

18. A method of controlling an electronic information device, said method comprising the steps of:

writing an image based on display data on a display which uses a material having a memory effect by supplying electric power to the display from an electric power source, the display having a write mode for writing an image on the display and a display mode for displaying the image written in the write mode without electric power, and when the write mode is interrupted before completion of the writing of the image, an incomplete image including a part of the image remains to be displayed on the display in the display mode;

issuing a specified command to instruct the electronic information device how to operate in response to a manual operation of a first input member by an operator; and when the first input member is operated while writing of an image based on display data on the display is being performed, invalidating the command sent from the first input member, and, when the first input member is operated after completion of the writing of an image based on display data, controlling the electronic information device in accordance with the command sent from the first input member;

whereby when the first input member is operated during writing of an image based on the display data on the display, the display completely displays the image which was being written based on the display data when the first input member was operated after the electric power source has been turned off.

19. A control method according to claim 18, wherein the first input member is for issuing a command to shut off the supply of electric power to the display.

20. A control method according to claim 19, further comprising the steps of:

issuing another command by operating a second input member; and controlling the electronic information device in accordance with the command sent from the second input member regardless of whether or not writing on the display is being performed.

21. A control method according to claim 20, wherein the second input member is a shutter button.

22. An electronic information device according to claim 4, wherein the electric power source is adapted to supply driving power to the electronic information device, including the display.

23. The control method according to claim 15, wherein the electric power source is adapted to supply electric power to the electronic information device, including the display.

24. An electronic information device which functions with a display including a write mode for writing an image on the display and a display mode thereafter for displaying the written image without electric power, and when the write mode is interrupted before completion of the writing of the image, an incomplete image including a part of the image remains to be displayed on the display in the display mode, the electronic information device comprising:

an electric power source for supplying driving power to the display;

a first input member to be operated by an operator to issue a turn-off command to turn off the electric power source; and a controller which, in response to a command to turn off the electric power source which is issued while the display is performing writing of an image based on display data by consuming electric power supplied from the electric power source, turns off the electric power source after completion of the writing of the image which is being written on the display based on the display data when the command to turn off the electric power source is issued;

whereby the display displays a complete image based on the display data after the electric power source has been turned off.

25. An electronic information device which functions with a display which uses a material having a memory effect, the display which has a write mode for writing an image on the display and a display mode thereafter for displaying the written image without electric power, and when the write mode is interrupted before completion of the writing of the image, an incomplete image including a part of the image remains to be displayed on the display in the display mode, the electronic information device comprising:

an electric power source for supplying driving power to the display;

an input member to be manually operated by an operator to input a specified command to instruct the electronic information device how to operate;

a timer for counting elapsed time; and a controller which resets a timer value when the manual operation of the input member is conducted, and increment the timer value when the write mode has been completed;

wherein the controller performs the following processes:

an automatic power-off process which turns off the electric power source automatically when a timer value exceeds a predetermined value;

whereby the display displays a complete image based on display data after the electric power source has been turned off.

26. An electronic information device which functions with a display which uses a material having a memory effect, the display which has a write mode for writing an image on the display and a display mode thereafter for displaying the written image without electric power, and when the write mode is interrupted before completion of the writing of the image, an incomplete image including a part of the image remains to be displayed on the display in the display mode, the electronic information device comprising:

a first input member which is manually operated by an operator to input a specified command to instruct the electronic information device how to operate; and a controller which, when the first input member is operated while writing an image based on display data on the display is being performed, invalidates the command sent from the first input member and, when the first input member is operated after completion of the writing of an image based on display data, controls the electronic information device in accordance with the command sent from the first input member;

whereby when the first input member is operated while writing the image based on the display data on the display, the display completely displays the image which is being written based on the display data when the first input member is operated after an electric power source supplying power to the display has been turned off.

* * * * *